(12) United States Patent
Tsuboi et al.

(10) Patent No.: US 12,185,120 B2
(45) Date of Patent: Dec. 31, 2024

(54) INSTALLATION CANDIDATE PRESENTATION METHOD, INSTALLATION CANDIDATE PRESENTATION APPARATUS AND PROGRAM

(71) Applicant: NIPPON TELEGRAPH AND TELEPHONE CORPORATION, Tokyo (JP)

(72) Inventors: Hideyuki Tsuboi, Musashino (JP); Kazuto Goto, Musashino (JP); Hideki Toshinaga, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 687 days.

(21) Appl. No.: 17/420,902

(22) PCT Filed: Jan. 8, 2020

(86) PCT No.: PCT/JP2020/000317
§ 371 (c)(1),
(2) Date: Jul. 6, 2021

(87) PCT Pub. No.: WO2020/145309
PCT Pub. Date: Jul. 16, 2020

(65) Prior Publication Data
US 2022/0070683 A1    Mar. 3, 2022

(30) Foreign Application Priority Data

Jan. 8, 2019   (JP) ................................. 2019-001401

(51) Int. Cl.
*H04W 16/18* (2009.01)
*H04B 17/391* (2015.01)

(52) U.S. Cl.
CPC ........ *H04W 16/18* (2013.01); *H04B 17/3912* (2015.01); *H04B 17/3913* (2015.01)

(58) Field of Classification Search
CPC ... H04W 16/18; H04W 16/14; H04W 64/003; H04B 17/3912; H04B 17/3913;
(Continued)

(56) References Cited

U.S. PATENT DOCUMENTS

2006/0003774 A1\* 1/2006 Byun .................... H04W 16/18
                                                                   455/452.1
2011/0124361 A1   5/2011 Hosono et al.
(Continued)

FOREIGN PATENT DOCUMENTS

| JP | 2006352551 A | 12/2006 |
|---|---|---|
| JP | 2011234091 A | 11/2011 |
| JP | 5070336 B2 | 11/2012 |

OTHER PUBLICATIONS

Tomohiro Tokuyasu et al., Development of a Station Design Tool to Support the Operation of Wireless System for Disaster Countermeasures, NTT Technology Journal, Nippon Telegraph and Telephone Corporation, vol. 29, No. 11, 2017, pp. 54-57, http://www.ntt.co.jp/journal/1711/files/JN20171154.pdf.
(Continued)

*Primary Examiner* — Fred A Casca
(74) *Attorney, Agent, or Firm* — Harness, Dickey & Pierce, P.L.C.

(57) ABSTRACT

An installation candidate presentation device extracts, for each of one or more installation candidates that are candidates for an installation place of a first wireless device, by using planar map data indicating a planar map of a region including the installation candidates, and a target building at which second wireless devices are to be installed, respectively, an outline range of the building, which is visible from the installation candidate. The installation candidate presen-
(Continued)

tation device calculates, for each installation candidate, by using three-dimensional map data indicating a three-dimensional map obtained by measuring the same region as the planar map data, area of part of a wall surface corresponding to the extracted outline range, the part being visible from the installation candidate, and calculates a total of the area calculated for the building in the region. The installation candidate presentation device presents an installation candidate selected based on the calculated total.

20 Claims, 18 Drawing Sheets

(58) Field of Classification Search
CPC . H04B 17/391; H04B 17/318; G01S 5/02524; G01S 11/06
See application file for complete search history.

(56) References Cited

U.S. PATENT DOCUMENTS

2018/0209802 A1 7/2018 Jung et al.
2020/0221314 A1* 7/2020 Cho .................. H04W 28/02

OTHER PUBLICATIONS

Nikkei Inc., Mobile base stations Down 30% Fujitsu Research Institute's New Design Technology, Nihon Keizai Shimbun electronic version, Nov. 13, 2014, https://www.nikkei.com/article/DGXMZO79643160T11C14A1000000/.

Ministry of Land, Infrastructure, Transport and Tourism National Institute for Land and Infrastructure Management, Chapter III Development of design information for existing houses and development of, etc., National Institute for Land and Infrastructure Management Project Research Report, 2018, No. 60, pp. 3-1-3-24, http://www.nilim.go.jp/lab/bcg/siryou/kpr/prn0060pdf/kp006008.pdf.

Reiji Yoshimura et al., Generation of High Quality Urban Model Using Aerial Photographic Measurement Mesh and MMS Measurement Point Clouds—Improvement of Aerial Photograph Measurement Mesh Using MMS Measurement Point Clouds—, Japan Society of Precision Engineering, 2016 Spring Meeting Academic Lecture Proceedings, Mar. 15, 2016, pp. 793-794, https://www.jstage.jst.go.jp/article/pscjspe/2016S/0/2016S_793/_pdf.

* cited by examiner

INSTALLATION CANDIDATE PRESENTATION METHOD, INSTALLATION CANDIDATE PRESENTATION APPARATUS AND PROGRAM

CROSS-REFERENCE TO RELATED APPLICATIONS

This application is a 371 U.S. National Phase of International Application No. PCT/JP2020/000317 filed on Jan. 8, 2020, which claims priority to Japanese Application No. 2019-001401 filed on Jan. 8, 2019. The entire disclosures of the above applications are incorporated herein by reference.

TECHNICAL FIELD

The present invention relates to an installation candidate presentation method, an installation candidate presentation device, and a computer program.

BACKGROUND ART

In housing and urban regions, it is required to provide a sufficient wireless communication environment from an outdoor communication facility to an indoor user. To achieve this, a novel method (such as a novel station allocation designing method) of finely and appropriately installing base stations is needed in addition to conventional base stations for cellular phones and smartphones. The following describes cases of allocation of base stations for wireless communication.

Patent Literature 1 discloses a method of housing a home base station corresponding to a mobile communication system. The home base station is a base station installed in a small-sized region such as a home, and a plurality of home base stations are housed in a wireless control device. The wireless control device prepares parameters for each group region and selects parameters in accordance with a group region in which home base stations are housed. With the housing method, it is possible to start operation of the home base stations by using appropriate parameter values determined based on the installation positions of the home base stations without performing large refurbishment of the home base stations.

FIG. 16 is a diagram illustrating a station allocation designing technology disclosed in Non-Patent Literature 1. In Non-Patent Literature 1, station allocation designing is performed to eliminate blind zones with as few base stations as possible. Among technologies applied to a tool configured to perform such station allocation designing, (a) terminal station grouping technology illustrated in FIG. 16 is particularly important because the technology restrains the transmission electric power of a base station, thereby reducing the amount of interference with other groups.

FIG. 17 is a diagram illustrating a base station disposition designing technology disclosed in Non-Patent Literature 2. The designing technology correctly calculates the rate of user allocation taking into account inter-base-station cooperative transmission. In a case where a macro base station and a small base station independently calculate user allocation as illustrated in Part (a) of FIG. 17, interference occurs and the quality decreases in a region in which the cells of the macro base station and the small base station overlap even when the small base station is additionally installed with the intention to cover the increased users in the cell of the macro base station. However, base station disposition using the designing technology illustrated in Part (b) of FIG. 17 supports inter-base-station cooperative transmission, and thus the quality increases in a region in which there are a large number of users by additionally installing the small base station so that cell overlapping with the macro base station occurs.

In the field of accurately measuring the situation of urban and housing regions, trials at using point group data have been performed, and two cases thereof will be described below.

FIG. 18 is a diagram illustrating a state in which point group data that models the shapes of houses is displayed by Revit (registered trademark) (Non-Patent Literature 3). Revit (registered trademark) is a three-dimensional CAD software application for building designing. The application processes point group data acquired from actual houses and models the shapes of the houses as illustrated in FIG. 18.

In Non-Patent Literature 4, point group data acquired by a mobile mapping system (MMS) is utilized for road surfaces and surrounding objects in an urban region, which cannot be accurately acquired based on measurement results with aerial pictures. A point group mesh converted and processed from the point group data of the MMS by performing fitting processing on an aerial picture mesh is embedded to establish high-quality measurement data.

CITATION LIST

Patent Literature

Patent Literature 1: Japanese Patent No. 5070336

Non-Patent Literature

Non-Patent Literature 1: Tomohiro Tokuyasu, Tsutomu Tatsuta, Hiroyuki Nakamura, "Development of station allocation designing tool that supports operation of disaster countermeasure wireless system", [online], NTT technology journal, Nippon Telegraph and Telephone Corporation, [Dec. 4, 2018 search], November 2017, p. 54-57, Internet <URL: http://www.ntt.co.jp/journal/1711/files/JN20171154.pdf>

Non-Patent Literature 2: "Reduction of mobile base stations by 30%: New designing technology by Fujitsu laboratories", [online], Nov. 13, 2014, Nihon Keizai Shimbun, [Dec. 4, 2018 search], Internet <URL: https://www.nikkei.com/article/DGXMZO79643160T11C14A1000000/>

Non-Patent Literature 3: "Chapter 3: Development of maintenance and management method for designing information of existing houses and the like", NILIM project research report, National Institute for Land and Infrastructure Management, Ministry of Land, Infrastructure, Transport and Tourism, Vol. 60, FIG. 3.6, February 2018, [online], [Dec. 4, 2018 search], Internet <URL: http://www.nilim.go.jp/lab/bcg/siryou/kpr/prn0060pdf/kp006008.pdf>

Non-Patent Literature 4: Reiji Yoshimura, Hiroaki Date, Satoshi Kanai, Ryohei Honma, Kazuo Oda, Tatsuya Ikeda, "High Quality Model Generation of Urban Area using Aerial Photograph Meshes and MMS Point Clouds—Improvement of Aerial Photograph Meshes by MMS Point Clouds—", [online], Japan Society for Precision Engineering, Academic lecture paper collection of 2016 JSPE Spring competition, pp. 793-794, [Dec. 4, 2018 search], Internet <URL: https://www.jstage.jst.go.jp/article/pscjspe/2016S/0/2016S_793/_pdf>

SUMMARY OF THE INVENTION

Technical Problem

As in the above-described examples, one form of wireless communication includes, for example, a method of allocating users to a small base station in a form to complement a macro cell base station, or station allocation designing of installing wireless communication between an evacuation center and a communication facility at the time of a disaster. For measurement of the environmental situation of urban and housing regions, information of existing houses is modeled with point group data of an MMS, and measurement point group data of aerial pictures is added to improve quality.

However, when a base station is fixed and installed at an outdoor communication facility such as a utility pole and a terminal station configured to wirelessly communicate with the base station is fixed and installed in each building, it is difficult to appropriately select and present a promising candidate in which the base station is to be installed from among a plurality of outdoor communication facilities taking into account the current situation (situation of environment and surroundings) of urban and housing regions. This is because, for example, aerial picture measurement and MMS point group data for the environmental situation of urban and housing regions and the like have enormous data amounts, and thus costs such as necessary calculation resources and calculation time significantly increase when these pieces of data are directly processed in addition to calculation conditions of allocation designing of base stations, which makes application difficult.

The present invention is intended to solve the above-described problem and provide an installation candidate presentation method, an installation candidate presentation device, and a computer program that can present a candidate position at which a base station is to be installed, when the base station fixed and installed outdoors wirelessly communicates with a terminal station fixed and installed at a building.

Means for Solving the Problem

An installation candidate presentation method according to an aspect of the present invention includes: a visibility extraction process of extracting, for each of one or more installation candidates that are candidates for an installation place of a first wireless device, by using planar map data indicating a planar map of a region including the installation candidates and a target building at which one or more second wireless devices configured to wirelessly communicate with the first wireless device are to be installed, respectively, an outline range of the building, which is visible from the installation candidate; a calculation process of calculating, for each installation candidate, by using three-dimensional map data indicating a three-dimensional map obtained by measuring the region, area of part of a wall surface corresponding to the outline range extracted by the visibility extraction process, the part being visible from the installation candidate; a total calculation process of calculating, for each installation candidate, a total of the areas calculated by the calculation process for the building included in the region; and a presentation process of presenting an installation candidate selected from among the installation candidates based on the total calculated by the total calculation process.

In the above-described installation candidate presentation method according to an aspect of the present invention, the calculation process calculates, for each installation candidate, by using the three-dimensional map data, the number of windows or balconies on the wall surface corresponding to the outline range extracted by the visibility extraction process, and the total calculation process calculates, for each installation candidate, a total number of the number of windows or balconies calculated by the calculation process for the building included in the region.

In the above-described installation candidate presentation method according to an aspect of the present invention, the installation candidate is an outdoor communication facility in the region or includes the communication facility and a position separated from the communication facility by a length in accordance with an instrument used to attach the first wireless device to the communication facility.

An installation candidate presentation device according to an aspect of the present invention includes: a storage unit configured to store planar map data indicating a planar map of a region including one or more installation candidates that are candidates for an installation place of a first wireless device, and a target building at which one or more second wireless devices configured to wirelessly communicate with the first wireless device are to be installed, respectively, and three-dimensional map data indicating a three-dimensional map obtained by measuring the region; a visibility extraction unit configured to extract, for each installation candidate, by using the planar map data, an outline range of the building, which is visible from the installation candidate; a calculation unit configured to calculate, for each installation candidate, by using the three-dimensional map data, area of part of a wall surface corresponding to the outline range extracted by the visibility extraction unit, the part being visible from the installation candidate; a total calculation unit configured to calculate, for each installation candidate, a total of the areas calculated by the calculation unit for the building included in the region; and a presentation unit configured to present an installation candidate selected from among the installation candidates based on the total calculated by the total calculation unit.

A computer program according to an aspect of the present invention causes a computer to function as the above-described installation candidate presentation device.

Effects of the Invention

According to the present invention, it is possible to present a candidate position at which a base station is to be installed, when the base station fixed and installed outdoors wirelessly communicates with a terminal station fixed and installed at a building.

DESCRIPTION OF EMBODIMENTS

Figure 1:
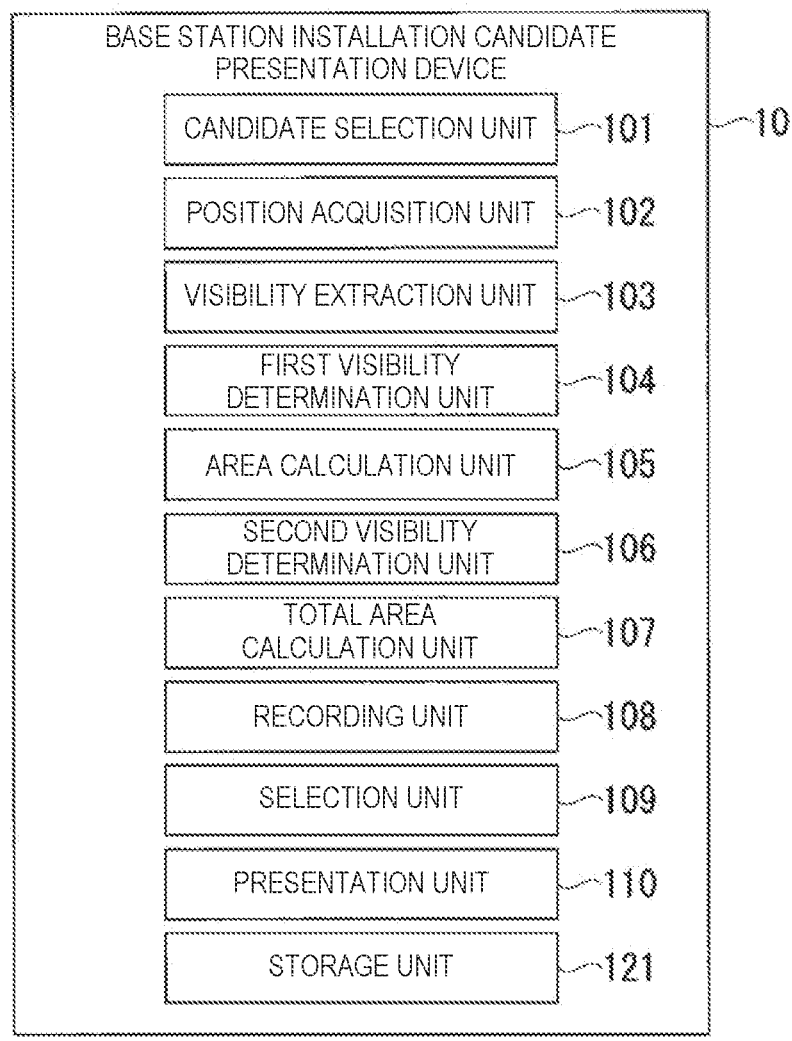
FIG. 1 is a block diagram illustrating the configuration of a base station installation candidate presentation device according to a first embodiment of the present invention.

Embodiments of the present invention will be described below in detail with reference to the accompanying drawings. The present embodiment relates to designing of a wireless communication system in which a first wireless device installed outdoors wirelessly communicates with one or more second wireless devices installed at buildings. The following description will be made on a case in which the first wireless device is a base station, and the second wireless device is a terminal station.

A base station installation candidate presentation device of the present embodiment extracts, by using building information included in a planar map used in communication tasks, when a base station is fixed to a communication facility such as a utility pole, a range (hereinafter also referred to as a "planar visible wall surface range") in which outlines of a plurality of buildings are visible from the place where the base station is fixed. Subsequently, the base station installation candidate presentation device utilizes separately acquired point group data to stereoscopically detect, for the planar visible wall surface range extracted by using the planar map, the range (hereinafter also referred to as a "stereoscopically visible wall surface range") of a wall surface of a building, which is visible from the base station, and calculates the area of the detected stereoscopically visible wall surface range. Similarly, the base station installation candidate presentation device calculates the area of the stereoscopically visible wall surface range of the base station for a case in which the base station is installed at a communication facility such as another utility pole. The base station installation candidate presentation device compares the area of the stereoscopically visible wall surface range calculated for each communication facility as a candidate at which the base station is to be installed, and selects a communication facility having the largest area. The base station installation candidate presentation device presents the position of the selected communication facility as a definitive candidate at which the base station is to be installed.

The base station installation candidate presentation device of the present embodiment selects and presents a definitive candidate at which the base station is to be installed by Solutions 1 to 3 below.

[Solution 1]

(Processing Procedure 1) Assume that terminal stations are to be installed at a plurality of buildings in a region (range) as a consideration target, and a base station configured to wirelessly communicate with the terminal stations is to be installed at an outdoor communication facility in the region. Hereinafter, the region as a consideration target of base station installation is referred to as a "consideration-target region", and a building at which a terminal station is already installed or likely to be installed in the consideration-target region is referred to as a "consideration-target building".

A place at which the base station is assumed to be installed is referred to as a base station installation candidate. The base station installation candidate presentation device extracts a planar visible wall surface range as an outline of a building that is visible from an outdoor base station installation candidate on a map.

(Processing Procedure 2) The base station installation candidate presentation device calculates the area of a stereoscopically visible wall surface range as the range of a wall surface that is visible from the base station installation candidate by using point group data, calculates the total sum of the area of the stereoscopically visible wall surface range of all consideration-target buildings in the consideration-target region, and records the total sum, in other words, the total area.

(Processing Procedure 3) The base station installation candidate presentation device performs Processing Procedures 1 and 2 for all base station installation candidates such as other outdoor communication facilities at which the base station can be installed.

(Processing Procedure 4) Having completed Processing Procedures 1 and 2 for all installation candidates, the base station installation candidate presentation device compares the total area of each stereoscopically visible wall surface range and presents a base station installation candidate having the maximum area.

Through the above-described procedures, the base station installation candidate presentation device presents which of a plurality of outdoor communication facilities is a finally selected base station installation candidate.

[Solution 2]

A base station installation candidate is not limited to the position of an outdoor communication facility, but may be positioned at where an auxiliary extension instrument is attached to the outdoor communication facility. Thus, the base station installation candidate presentation device performs Processing Procedure 3' in which a change as follows has been applied to Processing Procedure 3 of the base station installation candidate presentation method, which is indicated in Solution 1. Specifically, the base station installation candidate presentation device extends and diversifies the base station installation candidate from the position of the outdoor communication facility, and performs Processing Procedures 1 and 2 for the extended and diversified base station installation candidate (Processing Procedure 3').

[Solution 3]

In Solutions 1 and 2, the base station installation candidate presentation device selects, based on the total area of a stereoscopically visible wall surface range, a base station installation candidate to be presented. In the present embodiment, the base station installation candidate presentation device selects, based on the total number of windows and balconies in the stereoscopically visible wall surface range, a base station installation candidate to be presented. To achieve this, the base station installation candidate presentation device performs Processing Procedure 2' and Processing Procedure 2" as follows in place of Processing Procedure 2 in Solution 1 and 2. Specifically, the base station installation candidate presentation device detects the stereoscopically visible wall surface range with respect to the base station installation candidates by using point group data (Processing Procedure 2'), and also detects windows and balconies on a wall including the stereoscopically visible wall surface range, and detects visibility of the windows and balconies from the base station installation candidate (Processing Procedure 2"). The base station installation candidate presentation device also performs Processing Procedure 4' in place of Processing Procedure 4. Specifically, the base station installation candidate presentation device compares the total number of visible windows and balconies, which is calculated for each base station installation candidate, and selects and presents a base station installation candidate having the maximum number (Processing Procedure 4').

Detailed embodiments of Solutions 1 to 3 will be described below.

First Embodiment

In the present embodiment, a base station installation candidate is presented based on Solution 1 described above.

FIG. 1 is a functional block diagram illustrating the configuration of a base station installation candidate presentation device 10. The base station installation candidate presentation device 10 is achieved by, for example, one or more computer devices. The base station installation candidate presentation device 10 includes a candidate selection unit 101, a position acquisition unit 102, a visibility extraction unit 103, a first visibility determination unit 104, an area calculation unit 105, a second visibility determination unit 106, a total area calculation unit 107, a recording unit 108, a selection unit 109, a presentation unit 110, and a storage unit 121.

The storage unit 121 stores map data. The map data is, for example, data of a planar (two-dimensional) map of GeoSpace used in Outside plant Provisioning and inTelligent Operating Systems (Optos). The Optos is an existing tool configured to manage outdoor communication facilities, and the GeoSpace is an existing map information system. The map data includes information of partition boundaries, premises boundaries, and the building outlines of each building. The map data also includes additional information such as communication facility information and building information. The communication facility information includes identification information of a communication facility, and information of the position of the communication facility. The communication facility is, for example, a utility pole. The building information includes information such as the name, address, and phone number of the owner or resident of each building. The storage unit 121 also stores point group data acquired by MMS. The point group data is used as data of a three-dimensional map. Hereinafter, the simple notation of "map data" indicates data of a planar (two-dimensional) map.

The candidate selection unit 101 refers to the map data and the additional information, and selects a communication facility in the consideration-target region as a base station installation candidate. The position acquisition unit 102 acquires, from the additional information, information of the position of the base station installation candidate selected by the candidate selection unit 101. The visibility extraction unit 103 extracts the planar visible wall surface range of a consideration-target building from the base station installation candidate by using the map data. The first visibility determination unit 104 determines whether or not visibility can be ensured (whether the planar visible wall surface range exists) for all consideration-target buildings on the map data, and when having determined that visibility cannot be ensured, instructs the candidate selection unit 101 to select a new base station installation candidate.

The area calculation unit 105 calculates the area of the stereoscopically visible wall surface range with respect to an installation candidate position for each of a plurality of wall surfaces of each consideration-target building by using the point group data. The second visibility determination unit 106 determines whether or not there are stereoscopically visible wall surface ranges for all consideration-target buildings. When having determined that there are stereoscopically visible wall surface ranges for all consideration-target buildings, the second visibility determination unit 106 instructs the total area calculation unit 107 to perform processing. When having determined that there is a consideration-target building for which there is no stereoscopically visible wall surface range, the second visibility determination unit 106 instructs the candidate selection unit 101 to select a new base station installation candidate. The total area calculation unit 107 calculates a total area by summing the areas of the stereoscopically visible wall surface range of all consideration-target buildings in the consideration-target region. The recording unit 108 associates, and records in the storage unit 121, the total area calculated by the total area calculation unit 107 with the identification information and installation candidate position of the base station installation candidate.

The selection unit 109 refers to the wall surface total areas stored in the storage unit 121, and selects a base station installation candidate for which the maximum total area is obtained in the consideration-target region. The presentation unit 110 presents information of the base station installation candidate selected by the selection unit 109. The presentation is, for example, display on a display. The presentation may be printing using a printer, recording to a computer-readable-writable recording medium, or transmission to a computer device connected with the base station installation candidate presentation device 10 through a network.

Figure 2:
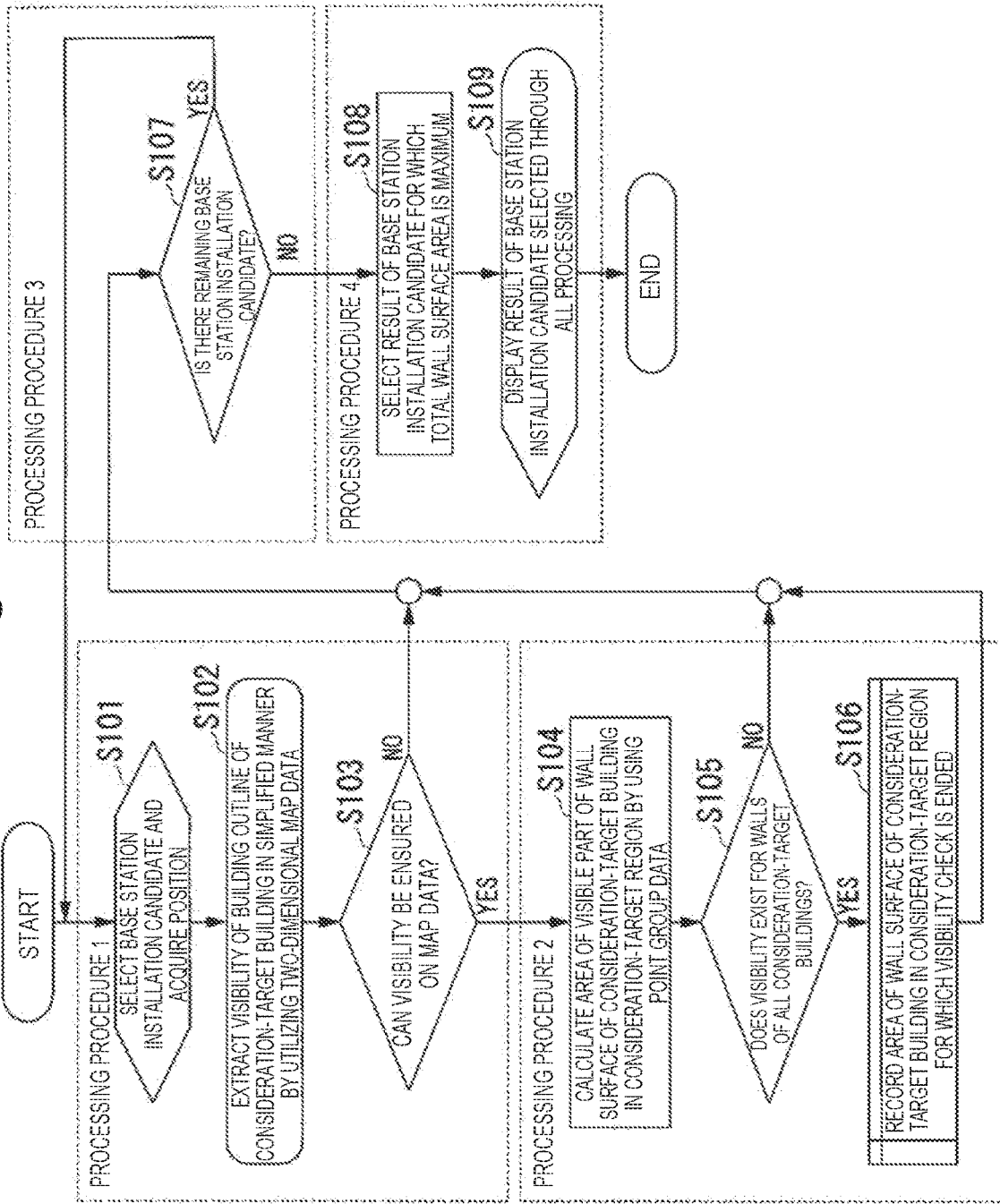
FIG. 2 is a diagram illustrating an operation flow of base station installation candidate presentation processing by the base station installation candidate presentation device according to the embodiment.

FIG. 2 is a diagram illustrating an operation flow of base station installation candidate presentation processing by the base station installation candidate presentation device 10.

The operation flow in FIG. 2 illustrates a specific processing flow of presenting a promising base station installation candidate by using the map data and the point group data. The following describes four processing procedures (processes) as main processes before detailed description of each processing in FIG. 2.

(Processing Procedure 1) The base station installation candidate presentation device 10 extracts a planar visible wall surface range that is the range of an outline (for example, a wall) of a consideration-target building that is visible from a base station on a planar map when the base station is installed at an outdoor communication facility (for example, a utility pole).

(Processing Procedure 2) The base station installation candidate presentation device 10 calculates, by using point group data, the area for each consideration-target building of a stereoscopically visible wall surface range that is the range of a wall surface visible from the base station, and calculates, and records in the storage unit 121, the total sum of the areas.

(Processing Procedure 3) The base station installation candidate presentation device 10 performs such control that Processing Procedures 1 and 2 are performed for all base station installation candidates such as another utility pole at which the base station can be installed.

(Processing Procedure 4) The base station installation candidate presentation device 10 compares the total areas of the wall surfaces calculated for the respective base station installation candidates and presents a base station installation candidate having the maximum area.

The following sequentially describes each processing in each processing procedure of the respective four processing procedures in detail. The consideration-target region and consideration-target buildings are input to the base station installation candidate presentation device 10 by an input means (not illustrated) or registered in the storage unit 121 in advance.

In the first Processing Procedure 1, the base station installation candidate presentation device 10 performs processing at steps S101 to S103 as follows.

When the base station installation candidate presentation device 10 starts the operation flow illustrated in FIG. 2, the candidate selection unit 101 first selects one communication facility in the consideration-target region as an initial value, and sets the communication facility as a processing-target base station installation candidate (step S101). Assume that the target region includes a plurality of base station installation candidates. The position acquisition unit 102 acquires information of the position of the selected base station installation candidate from the additional information of the map data stored in the storage unit 121, and sets the position as an installation candidate position. When having returned to the processing at step S101 again after the operation flow in FIG. 2 is started, the candidate selection unit 101 selects, as a processing target, a base station installation candidate different from the previously selected base station installation candidate, and the position acquisition unit 102 sets the position of the processing-target base station installation candidate as an installation candidate position.

The visibility extraction unit 103 extracts visibility of a building outline from the base station installation candidate in a simplified manner by utilizing the map data of the planar map (step S102). The visibility extraction unit 103 draws a straight line connecting the installation candidate position acquired by the position acquisition unit 102 at the previous step S101 and a building outline of a consideration-target building included in the consideration-target region on the two-dimensional map. When the drawn straight line does not overlap another building outline, it can be regarded that the building outline has visibility. The visibility extraction unit 103 performs this check processing for all building outlines of all consideration-target buildings in the consideration-target region to extract a planar visible wall surface range that is a building outline having visibility.

The first visibility determination unit 104 determines whether or not visibility can be ensured for all consideration target buildings on the map data (step S103). As a result of extraction of the planar visible wall surface range based on a building outline at the previous processing at step S102, it is probable that even part of outlines of one or more of the consideration-target buildings from among the consideration-target buildings in the consideration-target region is checked not to be visible from the installation candidate position. Thus, in the determination processing at step S103, the first visibility determination unit 104 determines whether or not visibility from the base station installation candidate exists (whether the planar visible wall surface range exists) for even part of building outlines of all consideration-target buildings in the consideration-target region. When having determined that visibility exists for all consideration-target buildings (YES at step S103), the first visibility determination unit 104 passes processing to the area calculation unit 105, and proceeds to step S104 in the next Processing Procedure 2. When having determined there is even part of a consideration-target building with no visibility (NO at step S103), the first visibility determination unit 104 passes processing to the candidate selection unit 101, and proceeds to step S107 in Processing Procedure 3 to be described later. Operation meant by Processing Procedure 1 described so far will be described later with reference to FIG. 3.

In Processing Procedure 2, the base station installation candidate presentation device 10 performs processing at steps S104 to S106.

The area calculation unit 105 calculates, by using point group data, the area of the respective wall surface of each consideration-target building, which is visible from the installation candidate position (step S104). Through the previous Processing Procedure 1, it is determined that visibility can be ensured for the building outlines (equivalent to walls) of all consideration-target buildings on the two-dimensional map. Thus, at step S104, the area calculation unit 105 checks the degree to which there is three-dimensional visibility of a wall surface of a consideration-target building in the consideration-target region from the base station installation candidate by using point group data acquired by an MMS having actually traveled in the consideration-target region instead of the planar (two-dimensional) map. The area calculation unit 105 performs this check per each one of all consideration-target buildings in the consideration-target region, and per each one of a plurality of wall surfaces included in one consideration-target building, and calculates the area of a stereoscopically visible wall surface range that is a range visible on the respective wall surfaces.

The second visibility determination unit 106 determines whether or not visibility exists for walls of all consideration-target buildings (step S105). At step S105 after it is regarded that visibility exists for the building outline (equivalent to walls) in Processing Procedure 1 as described above, it is determined whether three-dimensional visibility exists for all consideration-target buildings in the consideration-target region by using a result of the visibility check using the point group data. The visibility determination using the point group data is performed because, even though visibility exists on the two-dimensional map, no wall surface of a consideration-target building at which a terminal station is to be installed is visible from the position of a utility pole or the like as the base station installation candidate due to there being a premises boundary fence, a roadside tree, or the like in some cases in reality. When no visibility exists for all wall surfaces of even one of the consideration-target buildings, the second visibility determination unit 106 makes the negative determination at step S105, passes processing to the candidate selection unit 101, and proceeds to step S107 in Processing Procedure 3 to be described later. When three-dimensional visibility exists for wall surfaces of all consideration-target buildings in the consideration-target region, the second visibility determination unit 106 makes the positive determination at step S105, passes processing to the area calculation unit 105, and proceeds to the next step S106.

The recording unit 108 records the area of the stereoscopically visible wall surface range of a consideration-target building for which the visibility check by the area calculation unit 105 is ended (step S106). The total area calculation unit 107 calculates a total area obtained by summing the area of the stereoscopically visible wall surface range, which is calculated by the area calculation unit 105 at step S104 described above, for all consideration-target buildings in the consideration-target region (when a plurality of wall surfaces have stereoscopically visible wall surface ranges, the areas of the plurality of stereoscopically visible wall surface ranges are included).

The recording unit 108 records the calculated total area in the storage unit 121. At the recording, the recording unit 108 associates, and saves in the storage unit 121, the identification information and installation candidate position of the base station installation candidate that are the reference of visibility. The base station installation candidate presentation device 10 reads and uses the recorded information when comparison among all base station installation candidates is performed in the following Processing Procedure 4. Operation meant by Processing Procedure 2 described so far will be described later in detail with reference to FIGS. 4 and 6.

In Processing Procedure 3, the base station installation candidate presentation device 10 performs processing at step S107 as follows. Specifically, the candidate selection unit 101 determines whether or not there is any remaining base station installation candidate (step S107). Step S107 is executed when it is determined that there is a consideration-target building for which visibility cannot be ensured in the consideration-target region on the map data in Processing Procedure 1 (NO at step S103), when it is determined that there is a consideration-target building having no visibility in the consideration-target region based on the point group data in Processing Procedure 2 (NO at step S105), or when the processing of recording the total area of stereoscopically visible wall surface ranges of all consideration-target buildings in the consideration-target region in Processing Procedure 2 is ended (step S106). In these cases, the candidate selection unit 101 determines by checking whether or not there is still a further remaining base station installation candidate (communication facility different from any communication facility selected as a consideration target so far) in the consideration-target region other than the base station installation candidates selected so far. When having determined that there is any other base station installation candidate (YES at step S107), the candidate selection unit 101 returns to step S101 in Processing Procedure 1 again to select a base station installation candidate different from any already selected base station installation candidate, and the base station installation candidate presentation device 10 sequentially repeats the subsequent processing. When having determined that there is no other base station installation candidate (NO at step S107), the candidate selection unit 101 passes processing to the selection unit 109 and proceeds to step S108.

In Processing Procedure 4, the base station installation candidate presentation device 10 performs steps S108 and S109 as follows.

The selection unit 109 selects a base station installation candidate for which the maximum total area is obtained among the total areas of wall surfaces (stereoscopically visible wall surface ranges) recorded in the storage unit 121 (step S108). Specifically, the selection unit 109 compares all total areas of stereoscopically visible wall surface ranges per base station installation candidate recorded at step S106 in the previous Processing Procedure 2. The selection unit 109 selects, based on a result of the comparison, a base station installation candidate having the maximum total area of visible wall surfaces among all base station installation candidates having visibility checked for wall surfaces for all consideration-target buildings in the consideration-target region.

The presentation unit 110 displays a result of the base station installation candidate selected through the processing so far (step S109). Specifically, the presentation unit 110 presents, to a user, information of the base station installation candidate selected by the selection unit 109 at the previous step S108 through the processing so far. For example, the presentation unit 110 displays, on the display, information such as the name, identification information, and position on a map of the base station installation candidate selected by the selection unit 109. Operation meant by Processing Procedure 4 will be described later in detail with reference to FIG. 7.

At step S108 described above, the selection unit 109 may provide ranks in descending order of total area, and select a base station installation candidate at a predetermined rank or higher, or may select all base station installation candidates for which the total area is calculated. In this case, at step S109, the presentation unit 110 displays, on the display, rank information and total area information in addition to information such as the name, identification information, and position on a map of the base station installation candidate selected by the selection unit 109. The presentation unit 110 may display information of a base station installation candidate for which the negative determination is made at step S103 or S105 and display that no visibility exists.

Alternatively, the base station installation candidate presentation device 10 may perform the processing at step S104 as in the above-described case of the positive determination, when it is determined at step S103 that visibility exists for a part or a predetermined fraction or more of consideration-target buildings in the consideration-target region. The base station installation candidate presentation device 10 may perform the processing at step S106 as in the above-described case of the positive determination, when it is determined at step S105 that visibility exists for a part or a predetermined fraction or more of consideration-target buildings in a processing target region. In this case, the presentation unit 110 may present that visibility is ensured only for a part of the consideration-target buildings, may present the fraction of consideration-target buildings for which visibility is ensured in the consideration-target region, or may present information on consideration-target buildings for which visibility is ensured or not ensured.

Figure 3:
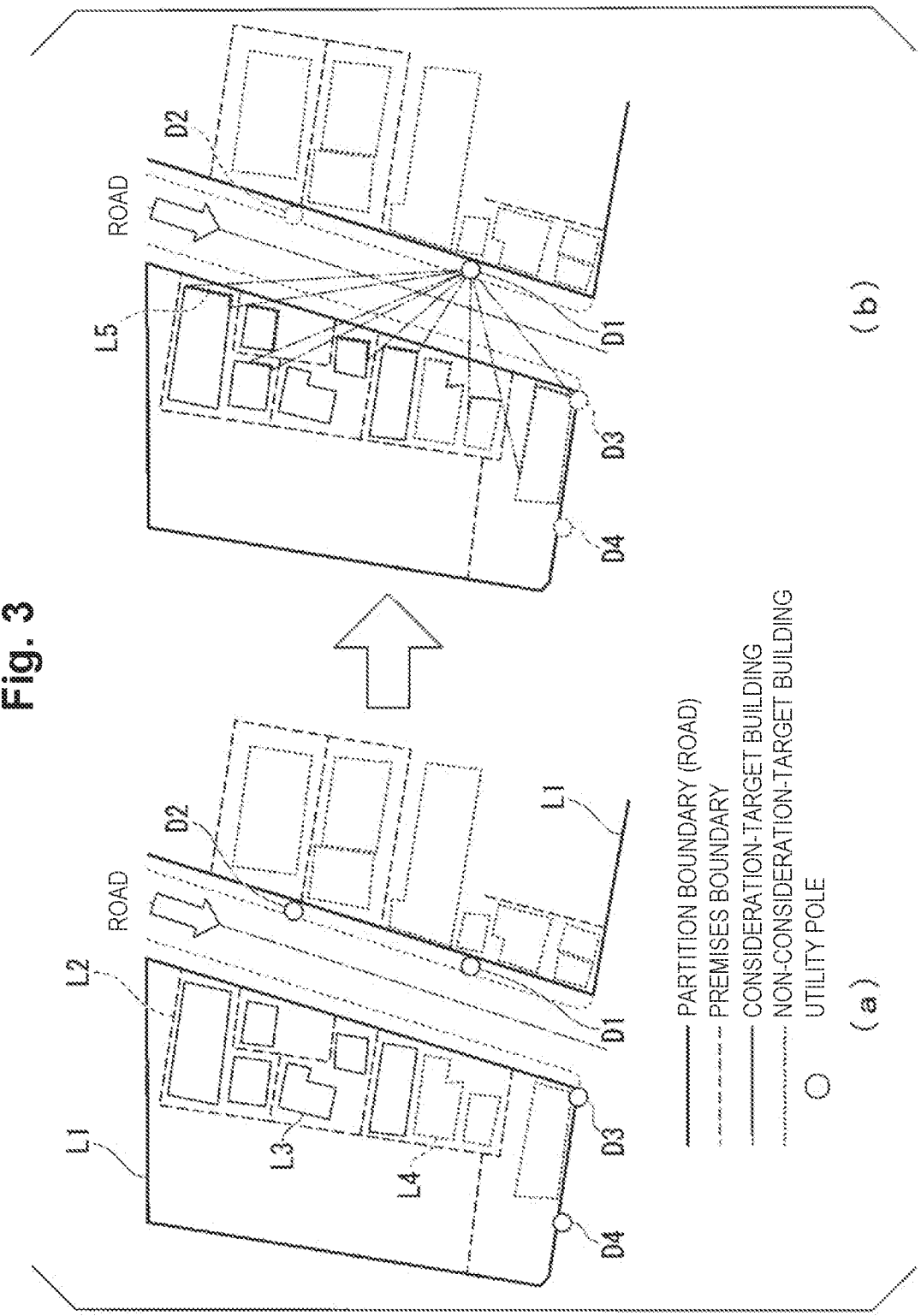
FIG. 3 is a diagram illustrating operation of Processing Procedure 1 performed by the base station installation candidate presentation device according to the embodiment.

FIG. 3 is a diagram illustrating operation of Processing Procedure 1 performed by the base station installation candidate presentation device 10. In the operation of Processing Procedure 1 illustrated in FIG. 3, an outline (wall) of a building that is visible from a base station installation candidate (utility pole) is extracted based on map data. Part (a) of FIG. 3 is exemplary map data, and is an excerpt of part of a housing region selected as a consideration-target region. Part (b) of FIG. 3 illustrates a situation of buildings in the housing region in which parts (planar visible wall surface ranges) of outlines (walls) of buildings, which are visible from a certain utility pole, are extracted by utilizing information added to the map data.

In the map data illustrated in Part (a) of FIG. 3, a partition boundary is illustrated by bold solid line L1 so that a road in the consideration-target housing region can be checked. In addition, a premises boundary is illustrated by dashed line L2, and a consideration-target building (or outlines and wall surfaces thereof) is illustrated by solid line L3. A building (or outlines or wall surfaces thereof) to be excluded as a consideration-target of the following is illustrated by dashed line L4. Reference signs D1 to D4 on the road and partition boundaries denote utility poles. A utility pole is one of the outdoor communication facilities.

The visibility extraction unit 103 calculates, by using the map data illustrated in FIG. 3, a planar visible wall surface range that is an outline (wall) of a consideration-target building, which is visible from each of the utility poles D1 to D4, assuming that a base station that is one of wireless stations mutually communicating with each other is installed at a utility pole, and a terminal station that is the other wireless station is installed at a plurality of buildings in the consideration-target housing region. This processing is equivalent to the processing at step S102 in FIG. 2 in the above description.

In Part (b) of FIG. 3, bold dashed lines L5 indicate planar visible wall surface ranges with respect to the utility pole D1 among the four utility poles D1 to D4. When many buildings are built closely together and are adjacent to each other, the visibility extraction unit 103 may determine that a place where the interval between buildings is small is not visible from the utility pole, and may exclude the place as a visibility check target. The place where the interval between buildings is small is determined by deciding on a threshold value. For example, with the threshold value of 40 cm, when the interval between buildings is equal to or smaller than 40 cm, only a wall surface range at 1 to 2 m from the road side is treated as a planar visible wall surface range even though visibility exists.

Figure 4:
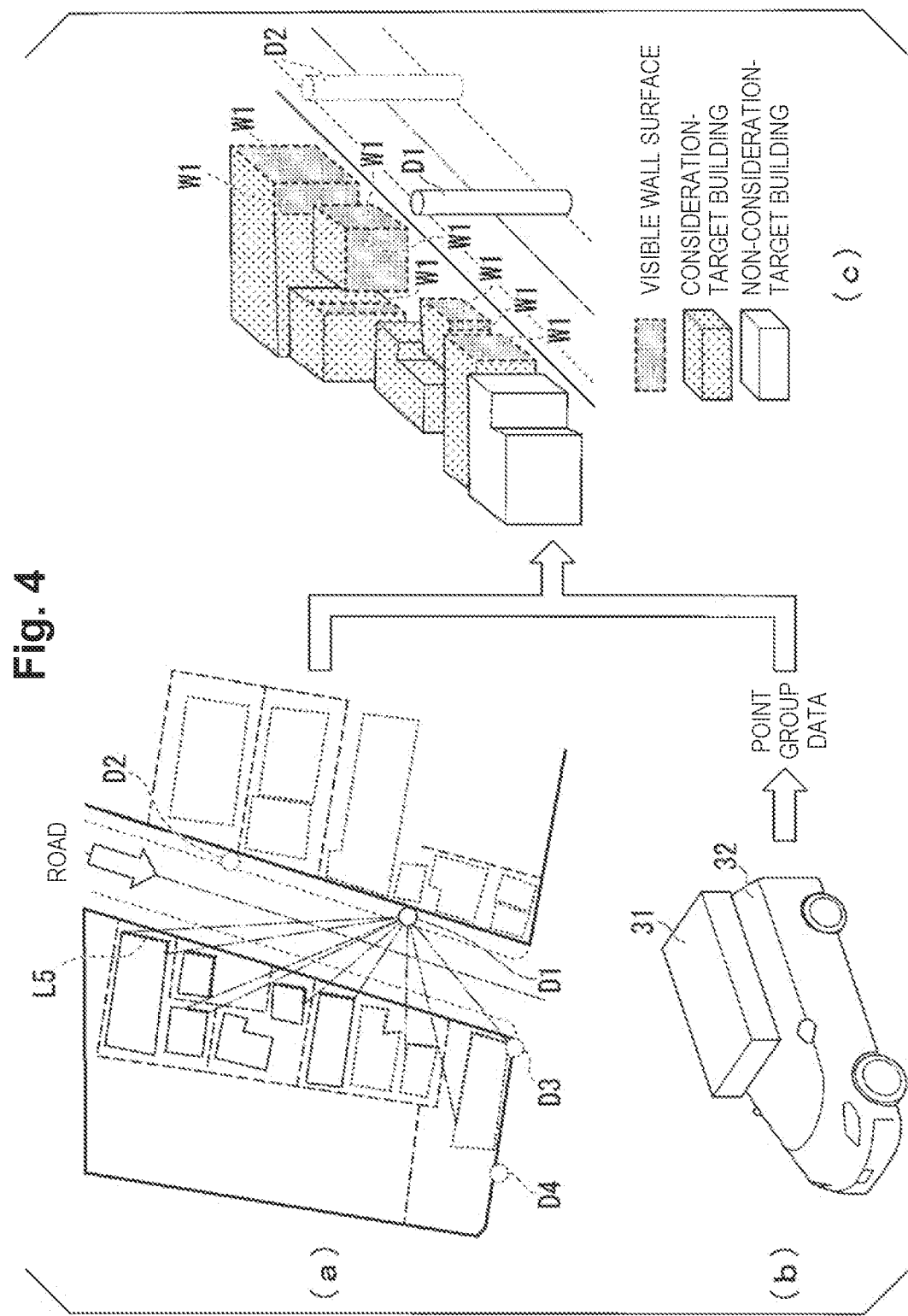
FIG. 4 is a diagram illustrating operation of Processing Procedure 2 performed by the base station installation candidate presentation device according to the embodiment.

FIG. 4 is a diagram illustrating operation of Processing Procedure 2 performed by the base station installation candidate presentation device 10. In Processing Procedure 2 illustrated in the drawing, the area calculation unit 105 calculates the areas of stereoscopically visible wall surface ranges by matching point group data with the map data illustrated in Part (b) of FIG. 3.

Part (a) of FIG. 4 illustrates information of the planar visible wall surface ranges L5 with respect to the utility pole D1, which are extracted as illustrated in Part (b) of FIG. 3 described above. Part (b) of FIG. 4 illustrates a vehicle 32 on which an MMS 31 is mounted. The vehicle 32 acquires point group data through the MMS 31 while traveling on roads around the consideration-target housing region. In Part (a) of FIG. 4, an arrow indicates a road traveled by the vehicle 32 on which the MMS 31 is mounted. The area calculation unit 105 utilizes the point group data acquired by the MMS 31 in addition to the above-described information of the planar visible wall surface ranges L5. Part (c) of FIG. 4 illustrates stereoscopically visible wall surface ranges W1 that are wall surfaces of consideration-target buildings that are visible from the utility pole D1, which are calculated based on the point group data.

In Part (c) of FIG. 4, which illustrates the operation of Processing Procedure 2 described with reference to FIG. 2, the area calculation unit 105 calculates the stereoscopically visible wall surface ranges W1 with respect to the utility pole D1 of consideration-target buildings in a three-dimensional space by matching the point group data with the map data. Thus, it is possible to narrow building wall surface information in the point group data acquired for the consideration-target housing region by using the positions (latitudes and longitudes) of the planar visible wall surface ranges L5 with respect to the utility pole D1, which are calculated based on the map data. Similarly, since the positions of the utility poles D1 to D4 are checked based on the map data, utility pole information in the point group data is narrowed as well. In this manner, the area calculation unit 105 can check how much visibility from the utility pole actually exists for a wall surface of which consideration target building by using both the point group data corresponding to a planar visible wall surface range L5 on the map, and the point group data corresponding to the utility pole on the map, and other three-dimensional point group data of surroundings thereof. Even though visibility exists on the map, the area of a wall surface that is visible from the utility pole may decrease due to screenings by a fence enclosure on a premises boundary or branches and leaves of a roadside tree in some cases in reality. The area calculation unit 105 can perform a check of the visibility affected by such actual screening objects by utilizing three-dimensional point group data.

Figure 5:
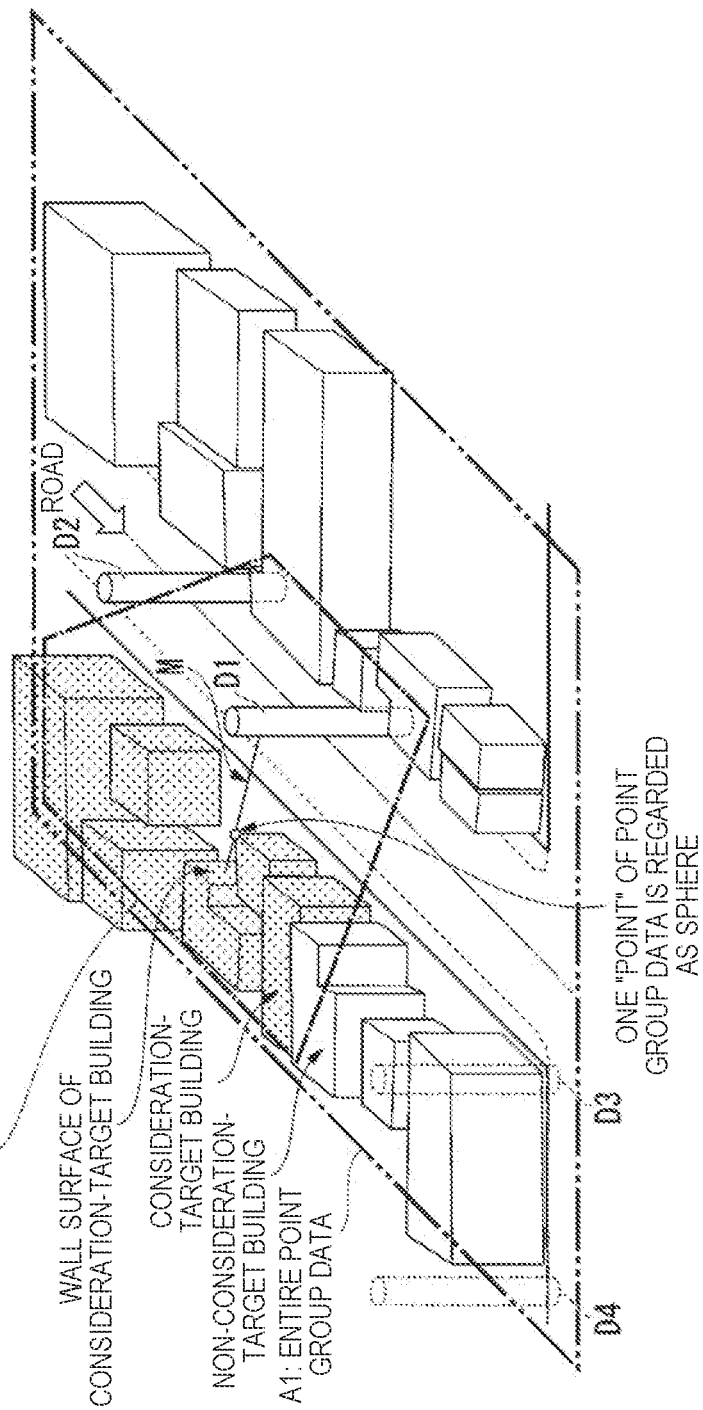
FIG. 5 is a diagram illustrating narrowing of point group data according to the embodiment.

The following describes point group data acquired by the MMS 31, and point group data utilized for the visibility check. FIG. 5 is a diagram illustrating narrowing of point group data acquired by the MMS 31. The area calculation unit 105 utilizes, in the visibility check processing, a part of point group data narrowed as illustrated in FIG. 5. Range A1 is the range of point group data acquired by the MMS 31 as the vehicle 32 travels through a road on the map illustrated in FIG. 3. The data amount of the point group data acquired by the MMS 31 is enormous. Thus, in performing Processing Procedure 2 of checking the stereoscopically visible wall surface range W1 of each consideration-target building with respect to a utility pole based on point group data as illustrated in Part (c) of FIG. 4, use of the entire point group data of Range A1 is not realistic in terms of costs such as calculation resources and calculation time.

Thus, the area calculation unit 105 narrows the processing target to Range A2 including the consideration-target buildings in the range of the consideration-target housing region and any utility pole that is a base station installation candidate, and checks visibility existence by using point group data of the narrowed range A2. At narrowing of the range of point group data, the area calculation unit 105 utilizes map data and additional information, calculates the positions (latitudes and longitudes) of each consideration-target building and each utility pole from the map data and the additional information, and narrows the point group data to Range A2 based on the latitudes and longitudes. Each individual point in the point group data is dimensionless. Thus, when performing visibility determination by using the point group data, for example, the area calculation unit 105 regards each point of the point group data as a sphere having a diameter of approximately 10 cm. The area calculation unit 105 determines visibility existence by checking whether or not a point group as a sphere intersects a straight line M connecting a utility pole and a wall surface of a consideration-target building.

Figure 6:
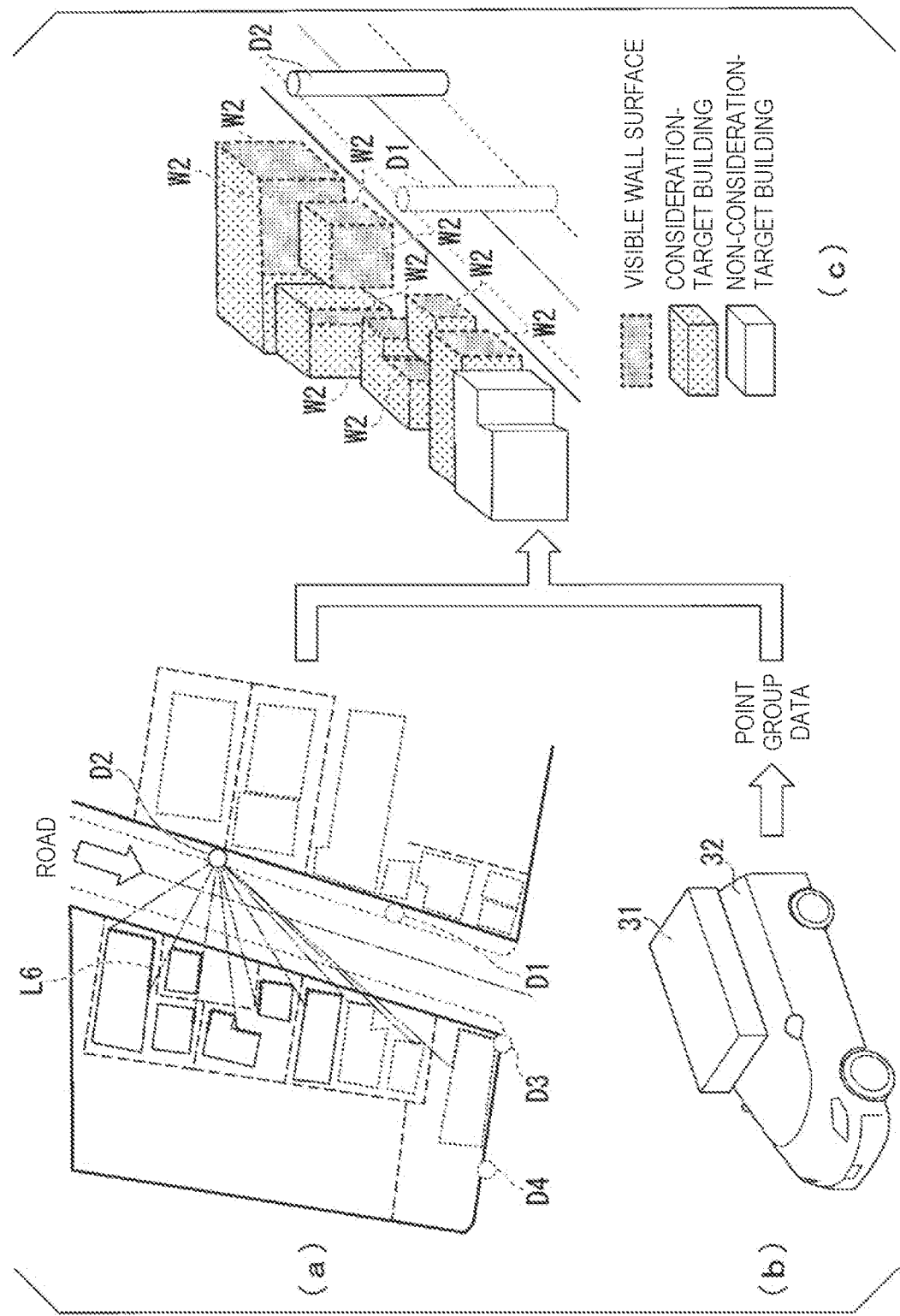
FIG. 6 is a diagram illustrating operation of Processing Procedure $2^{(x)}$ performed by the base station installation candidate presentation device according to the embodiment.

FIG. 6 is a diagram illustrating operation of Processing Procedure $2^{(x)}$ performed by the base station installation candidate presentation device 10. Processing Procedure $2^{(x)}$ is Processing Procedure 2 performed for the installation candidate position of the x-th base station installation candidate. Processing Procedure 2 illustrated in FIG. 4 is equivalent to Processing Procedure $2^{(1)}$. In Processing Procedure $2^{(x)}$ illustrated in FIG. 6 (in this example, x is an integer equal to or larger than two), the area calculation unit 105 calculates the area of the stereoscopically visible wall surface range of the consideration-target building with respect to an installation candidate position different from that in FIG. 5.

Part (a) of FIG. 6 illustrates information of planar visible wall surface ranges L6 that are outlines (walls) of buildings that are visible from the utility pole D2, which is acquired in the same manner as in FIG. 3. Part (b) of FIG. 6 illustrates the vehicle 32 on which the MMS 31 is mounted and that has travelled on roads around a housing region same as that in FIG. 3. Similarly to FIG. 4, the area calculation unit 105 utilizes point group data acquired by the MMS 31 in addition to information of the planar visible wall surface ranges L6 of consideration-target buildings having visibility. Part (c) of FIG. 6 illustrates a result obtained when the area calculation unit 105 calculates stereoscopically visible wall surface ranges W2 that are wall surfaces of consideration-target buildings that are visible from the utility pole D2 by using the point group data.

In this manner, FIG. 6 illustrates operation same as or similar to that of Processing Procedure 2 illustrated in the previous FIG. 4. Difference is such that a utility pole different from that in FIG. 4 is used as a candidate for the installation position of a base station.

In Part (a) of FIG. 6, another utility pole D2, which is different from the utility pole D1 used in FIG. 4, is selected from among the four utility poles D1 to D4 on the map, and in Part (c) of FIG. 6, it is checked how much visibility from the utility pole D2 exists for wall surfaces of consideration-target buildings. The area calculation unit 105 performs, in addition to Processing Procedure 2 (equivalent to Processing Procedure $2^{(1)}$) illustrated in FIG. 4 and Processing Procedure 2 (Processing Procedure $2^{(x)}$) illustrated in FIG. 6, Processing Procedure 2 a number of times equal to the number of base station installation candidates from which visibility can be ensured on the map among base station installation candidates such as other utility poles. When n represents the number of base station installation candidates from which visibility exists for all consideration-target buildings in the consideration-target region, the area calculation unit 105 performs Processing Procedure $2^{(1)}$, . . . , Processing Procedure $2^{(x)}$, . . . , Processing Procedure $2^{(n)}$ to determine visibility existence of wall surfaces of the consideration-target buildings, and calculate the area of the stereoscopically visible wall surface range.

Figure 7:
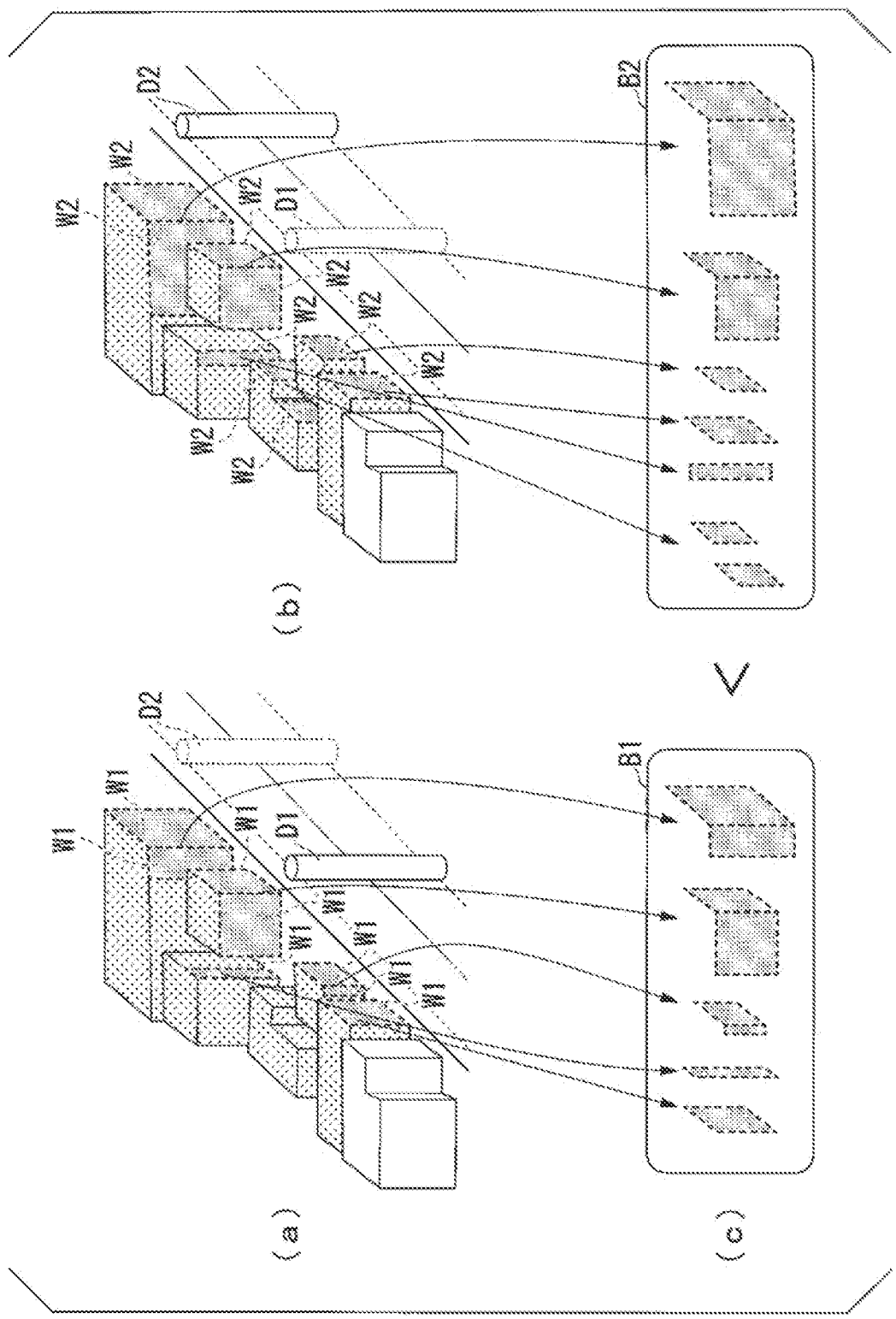
FIG. 7 is a diagram illustrating operation of Processing Procedure 4 performed by the base station installation candidate presentation device according to the embodiment.

FIG. 7 is a diagram illustrating operation of Processing Procedure 4 performed by the base station installation candidate presentation device 10. In Processing Procedure 4 illustrated in FIG. 7, the selection unit 109 compares the total area of stereoscopically visible wall surface ranges calculated for each of a plurality of base station installation candidates. The following description is made on an example in which the base station installation candidates from which visibility exists for wall surfaces of all consideration-target buildings are the two utility poles D1 and D2.

Part (a) of FIG. 7 illustrates stereoscopically visible wall surface ranges W1 of the consideration-target buildings with respect to the utility pole D1, which are calculated by the area calculation unit 105 in FIG. 4. Part (b) of FIG. 7 illustrates stereoscopically visible wall surface ranges W2 of the consideration-target buildings with respect to the other utility pole D2, which are calculated by the area calculation unit 105 in FIG. 6. Part (c) of FIG. 7 is a diagram illustrating comparison between the total areas of the stereoscopically visible wall surface ranges W1 and W2.

Part (a) of FIG. 7 is the situation seen from a birds-eye view of buildings (targets at which a wireless terminal station is to be installed) and utility poles (candidates at which a base station is to be installed) in the consideration-target housing region based on point group data. Part (a) of FIG. 7 illustrates a result (Part (c) of FIG. 4) of checking wall surfaces of the consideration-target buildings, which are visible from the utility pole D1 by utilizing the point group data where the utility pole D1 among the two utility poles D1 and D2 erected on a road is a consideration target. The stereoscopically visible wall surface ranges W1 are parts that are visible from the utility pole D1.

Similarly, Part (b) of FIG. 7 is a situation seen from a birds-eye view of the buildings and the utility poles in the consideration-target housing region based on point group data. Part (b) of FIG. 7 illustrates a result (Part (c) of FIG. 6) of checking wall surfaces of the consideration-target buildings, which are visible from the utility pole D2 by utilizing the point group data where the utility pole D2 among the two utility poles D1 and D2 erected on the road is a consideration target. The stereoscopically visible wall surface ranges W2 are parts that are visible from the utility pole D2.

In Part (c) of FIG. 7, reference sign B1 only denotes the stereoscopically visible wall surface ranges W1 of the consideration-target buildings, which are visible from the utility pole D1 described above, and reference sign B2 only denotes the stereoscopically visible wall surface ranges W2 of the consideration-target buildings, which are visible from the utility pole D2 described above. One consideration-target building may include a plurality of wall surfaces including stereoscopically visible wall surface ranges. Since the number of stereoscopically visible wall surface ranges is equal to the number of buildings as illustrated in Part (c) of FIG. 7, the total area calculation unit 107 sums the areas of the stereoscopically visible wall surface ranges of the plurality of buildings in the consideration-target housing region. The selection unit 109 compares the total area of the stereoscopically visible wall surface ranges W1 with respect to the utility pole D1 and the total area of the stereoscopically visible wall surface ranges W2 with respect to the utility pole D2. In the example of Part (c) of FIG. 7, the total area calculated for the utility pole D2 is larger.

Similarly, the base station installation candidate presentation device 10 calculates the total of the areas of stereoscopically visible wall surface ranges of the consideration-target buildings with respect to any other utility pole, and the selection unit 109 compares the total areas. Specifically, the base station installation candidate presentation device 10 determines whether wall surfaces of the consideration-target buildings are visible from the positions (installation candidate positions) of all utility poles in the consideration-target housing region, and performs comparison to determine which utility pole is selected when the total of stereoscopically visible wall surface ranges is large. Through comparison among all utility poles, the presentation unit 110 determines a utility pole having the maximum total area as a base station installation candidate to be presented (Processing Procedure 4 illustrated in FIG. 2).

Second Embodiment

In the present embodiment, a base station installation candidate is presented based on Solution 2. In the first embodiment, communication facilities are base station installation candidates. In the present embodiment, surroundings of a communication facility are base station installation candidates as well to diversify base station installation candidates. The following description will be mainly made on the difference from the first embodiment.

Figure 8:
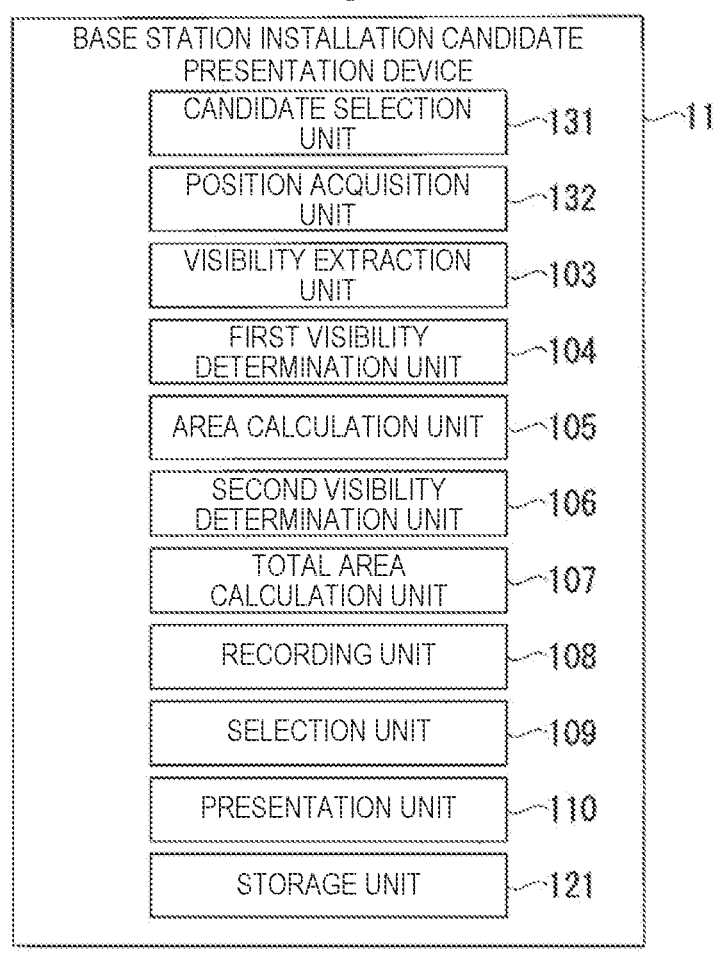
FIG. 8 is a block diagram illustrating the configuration of a base station installation candidate presentation device according to a second embodiment.

FIG. 8 is a functional block diagram illustrating the configuration of a base station installation candidate presentation device 11. In FIG. 8, a portion identical to that of the base station installation candidate presentation device 10 according to the first embodiment illustrated in FIG. 1 is denoted by an identical reference sign, and description thereof is omitted. The base station installation candidate presentation device 11 illustrated in the drawing is different from the base station installation candidate presentation device 10 of the first embodiment in that a candidate selection unit 131 and a position acquisition unit 132 are provided in place of the candidate selection unit 101 and the position acquisition unit 102. The candidate selection unit 131 selects diversified base station installation candidates. Specifically, the communication facility in the consideration-target region, and a position separated from the communication facility by a distance in accordance with the installation form of a base station are base station installation candidates. The position acquisition unit 132 acquires the positions of each base station installation candidate including diversified base station installation candidates.

Figure 9:
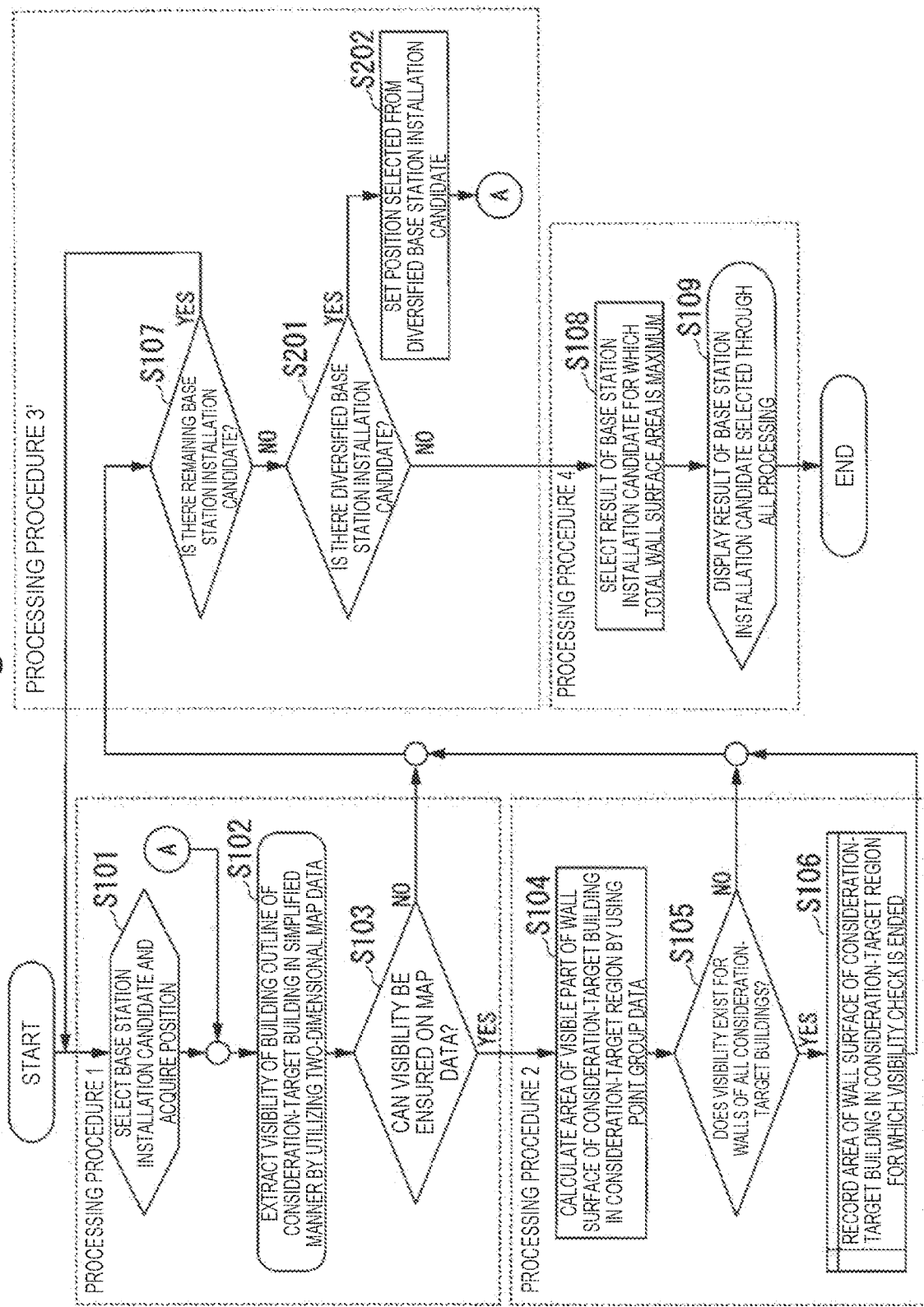
FIG. 9 is a diagram illustrating an operation flow of base station installation candidate presentation processing by the base station installation candidate presentation device according to the embodiment.

FIG. 9 is a diagram illustrating an operation flow of base station installation candidate presentation processing by the base station installation candidate presentation device 11. In the drawing, processing same as that in the operation flow of the first embodiment illustrated in FIG. 2 is denoted by a reference sign in the drawing, and detailed description thereof is omitted. Similarly to the operation flow of the first embodiment illustrated in FIG. 2, the operation flow of the base station installation candidate presentation device 11 of the present embodiment illustrated in FIG. 9 mainly includes four processing procedures (processes). Specifically, in the first Processing Procedure 1, the base station installation candidate presentation device 11 extracts a planar visible wall surface range that is the range of an outline (wall) of a building that is visible from a base station to be installed at an outdoor facility (utility pole) on a map. In the next Processing Procedure 2, the base station installation candidate presentation device 11 calculates, by using point group data, the area of a stereoscopically visible wall surface range that is the range of a wall surface, which is visible from the base station, of each consideration-target building, calculates the total sum of the areas, and records the sum in the storage unit 121.

In the operation flow in FIG. 9, the base station installation candidate presentation device 11 performs Processing Procedure 3' in place of Processing Procedure 3 in FIG. 2. In Processing Procedure 3 in FIG. 2, the base station installation candidate presentation device 10 of the first embodiment performs such control that Processing Procedures 1 and 2 are performed for all base station installation candidates such as other utility poles at which the base station can be installed. In Processing Procedure 3', the base station installation candidate presentation device 11 does not limit a base station installation candidate to an outdoor communication facility (for example, a utility pole) as a management target on the map, but extends and diversifies the base station installation candidate to a position at which the base station can be installed by, for example, attaching an auxiliary extension instrument to the outdoor communication facility. The operation flow in FIG. 9 includes processing of Processing Procedure 3' that takes into consideration this diversified installation candidate position. In Processing Procedure 4, the base station installation candidate presentation device 11 compares the total areas of wall surfaces calculated for each base station installation candidate, and presents a base station installation candidate having the maximum total area. The following sequentially describes each processing of the respective four processing procedures.

First in Processing Procedure 1, the candidate selection unit 131 selects any one of the communication facilities in the consideration-target region, and the position acquisition unit 132 acquires information of the position of the selected base station installation candidate from the additional information of map data (step S101). The visibility extraction unit 103 extracts visibility of a building outline from the base station installation candidate in a simplified manner by utilizing the map data of a two-dimensional map (step S102). The first visibility determination unit 104 determines whether or not visibility can be ensured for all consideration-target buildings on the map data (step S103). When having determined that visibility can be ensured for all consideration-target buildings (YES at step S103), the first visibility determination unit 104 passes processing to the area calculation unit 105, and proceeds to step S104 in Processing Procedure 2. When having determined that visibility cannot be ensured for even part of a consideration-target building (NO at step S103), the first visibility determination unit 104 passes processing to the candidate selection unit 131, and proceeds to step S107 in Processing Procedure 3'.

In Processing Procedure 2, the area calculation unit 105 calculates, by using point group data, the area of part of the wall surface of each consideration-target building, which is visible from the installation candidate position (step S104). The second visibility determination unit 106 determines whether or not visibility exists for walls of all consideration-target buildings (step S105). When it is determined that there is a consideration-target building for which visibility does not exist (NO at step S105), the candidate selection unit 101 performs processing at step S107 in Processing Procedure 3'. When it is determined that visibility exists for walls of all consideration-target buildings (YES at step S105), the total area calculation unit 107 calculates a total area by summing the areas of stereoscopically visible wall surface ranges of all consideration-target buildings in the consideration-target region. The recording unit 108 associates, and records in the storage unit 121, the calculated total area with the identification information and installation candidate position of the base station installation candidate (step S106).

Processing Procedures 1 and 2 so far as illustrated in FIG. 9 are same as those in the first embodiment illustrated in FIG. 2. In Processing Procedure 3', the base station installation candidate presentation device 11 performs processing at steps S107 and S201 to S202 as follows.

The candidate selection unit 131 determines whether or not there is a remaining base station installation candidate (step S107). Step S107 is executed when it is determined in Processing Procedure 1 that there is a consideration-target building for which visibility cannot be ensured in the consideration-target region on the map data (NO at step S103), when it is determined by the point group data in Processing Procedure 2 that there is a consideration-target building for which visibility does not exist in the consideration-target region (NO at step S105), or when the processing of recording the total area of stereoscopically visible wall surface ranges of all consideration-target buildings in the consideration-target region in Processing Procedure 2 is ended (step S106). In these cases, the candidate selection unit 131 performs determination by checking whether or not there are further remaining base station installation candidates in the consideration-target region other than a base station installation candidate selected so far (step S107). When having determined that there is another base station installation candidate (YES at step S107), the candidate selection unit 131 returns to step S101 in Processing Procedure 1 again, and selects a base station installation candidate different from an already selected base station installation candidate, and the base station installation candidate presentation device 11 sequentially repeats the subsequent processing. When having determined that there is no other base station installation candidate (NO at step S107), the candidate selection unit 131 proceeds to step S201.

The candidate selection unit 131 determines whether or not there is a diversified base station installation candidate (step S201). The base station installation candidate check at the previous step S107 is targeted at an outdoor communication facility such as a utility pole as a management target in the map data (same as in the first embodiment). However, the present embodiment is not limited to such an outdoor communication facility, but a base station installation candidate is extended and diversified to the range of several meters from the utility pole by, for example, attaching an auxiliary extension instrument as if, at an intersection, a traffic light is attached to a utility pole (support pillar) at a position that can be easily seen from a traveling automobile entering the intersection. The candidate selection unit 131 checks, for this diversified base station installation candidate as well, whether or not there is a remaining base station installation candidate.

The distance of the diversified base station installation candidate from the utility pole may be a distance stored in the storage unit 121 in advance, or may be a distance in accordance with information of the kind of a base station expected to be installed, which is stored in the storage unit 121 in advance, the kind of an extension instrument to be used, and the like. The direction of the diversified base station installation candidate with respect to the utility pole is at angles obtained by dividing the range of 0° to 360° by a predetermined angle (for example, 0°, 90°, 180°, and 270°, which are obtained by dividing the range by 90°) with respect to a predetermined direction (for example, East or a direction parallel to a road) at 0°. When having determined that there is a diversified base station installation candidate (YES at step S201), the candidate selection unit 131 performs processing at step S202. When having determined that there is no remaining base station installation candidate and the diversified base station installation candidate is already considered (NO at step S201), the candidate selection unit 131 passes processing to the selection unit 109 and proceeds to step S108 in Processing Procedure 4.

The candidate selection unit 131 selects one diversified base station installation candidate, and the position acquisition unit 132 sets the position of the selected base station installation candidate as a calculation condition (step S202).

The operation at this step S202 is performed since it is checked that there is still a remaining diversified base station installation candidate at the previous step S201 (YES at step S201). Thus, after the position acquisition unit 132 acquires the position of the base station installation candidate selected from among remaining diversified base station installation candidates at this step S202, the visibility extraction unit 103 performs the processing at step S102 in Processing Procedure 1 again. The base station installation candidate diversification related to the Processing Procedure 3' will be described later in detail with reference to FIG. 10.

In the last Processing Procedure 4, the selection unit 109 selects a base station installation candidate for which the maximum total area is obtained among the total areas of wall surfaces (stereoscopically visible wall surface ranges) recorded in the storage unit 121 (step S108). Similarly to the first embodiment, the presentation unit 110 presents a result of the base station installation candidate selected at step S108 (step S109).

Figure 10:
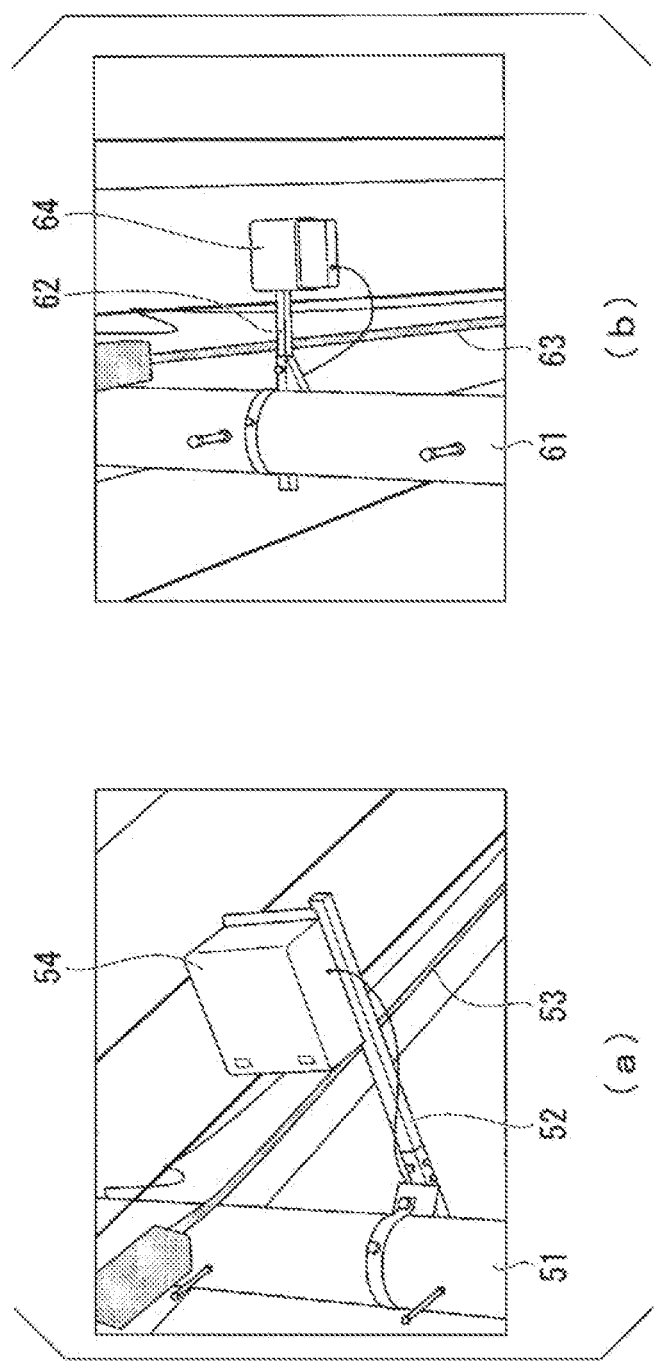
FIG. 10 is a diagram illustrating an exemplary form of attachment of a base station to a utility pole according to the embodiment.
Figure 11:
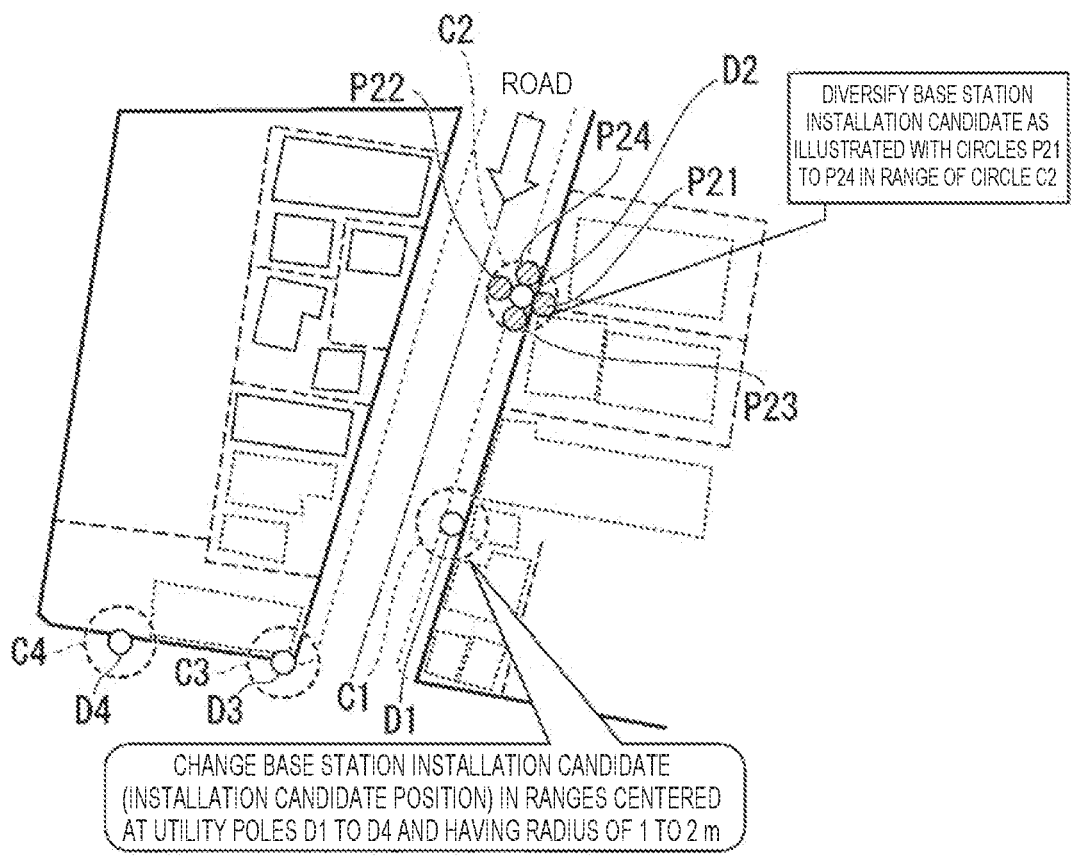
FIG. 11 is a diagram illustrating exemplary diversification of base station installation candidates according to the embodiment.

The following describes, with reference to FIGS. 10 and 11, diversification of candidates (base station installation candidates) at which a base station can be installed through various forms of attachment to a utility pole.

FIG. 10 illustrates an exemplary form of attachment of a base station to a utility pole. Part (a) of FIG. 10 and Part (b) of FIG. 10 illustrate different forms of base station attachment. In Part (a) of FIG. 10, reference sign 51 denotes a utility pole, reference sign 52 denotes an auxiliary instrument, and reference sign 53 denotes a communication cable. Reference sign 54 denotes a base station, specifically, a WiMAX R2.1 AE base station. In Part (b) of FIG. 10, reference sign 61 denotes a utility pole, reference sign 62 denotes an auxiliary instrument, and reference sign 63 denotes a communication cable. Reference sign 64 denotes a base station, specifically, an NTT DoCoMo multi-drop optical feeder (MOF). For example, a wireless station can be attached to a utility pole in various forms as in the examples illustrated in Parts (a) and (b) of FIG. 10. From these various installation situations, it is understood that a bar attachment jig is provided in the horizontal direction as an attachment auxiliary instrument halfway through a utility pole between the ground and the upper end thereof, and a device such as a base station is installed at an interval from the utility pole. It is also understood that the position halfway through the utility pole to which the auxiliary instrument is attached is slightly lower than the height of the communication cable.

FIG. 11 is a diagram illustrating exemplary base station installation candidate diversification. FIG. 11 illustrates a range (installation candidate position) where a base station installation candidate diversified through the form of installation of a base station to a utility pole can be positioned on a map. FIG. 11 indicates that, as diversification of a base station installation candidate for a base station to be attached to a utility pole, the range in which a base station installation candidate can be positioned on the map is a circle Ci centered at a utility pole Di (i=1, 2, 3, 4 in the drawing) and having a radius of 1 to 2 m. In particular, for the utility pole D2 among the four utility poles D1 to D4, for example, circles P21 to P24 in the directions of north, south, east, and west centered at the utility pole D2 are illustrated in the range of the circle C2. To achieve the positions of the circles P21 to P24 in the range of the circle C2 as base station installation candidates, a horizontally installed bar part can be extended or expanded to a desired length by an auxiliary instrument for attaching a base station to the utility pole D2 as illustrated in FIG. 10. In this manner or any other manner, the circles P21 to P24 illustrated on the map can be diversified candidates for the position at which a base station is installed. Through this processing, diversified base station installation candidates can also be considered in the operation flow of the base station installation candidate presentation device 11 illustrated in the previous FIG. 9. As described above, base station installation candidate diversification can be achieved by changing base station installation candidates (installation candidate positions) in a range centered at a utility pole and having a radius of 1 to 2 m, which makes it easier to obtain visibility with building wall surfaces.

Third Embodiment

In the present embodiment, a base station installation candidate is presented based on Solution 3. In the first and second embodiments, a base station installation candidate to be presented is selected based on the total area of stereoscopically visible wall surface ranges. In the present embodiment, a base station installation candidate to be presented is selected based on the number of windows and balconies on a wall surface of the stereoscopically visible wall surface range of a consideration-target building. For example, the present embodiment can be considered to be applicable to a case in which a terminal station is installed at a window or a balcony. The following description will be mainly made on difference from the first and second embodiments.

Figure 12:
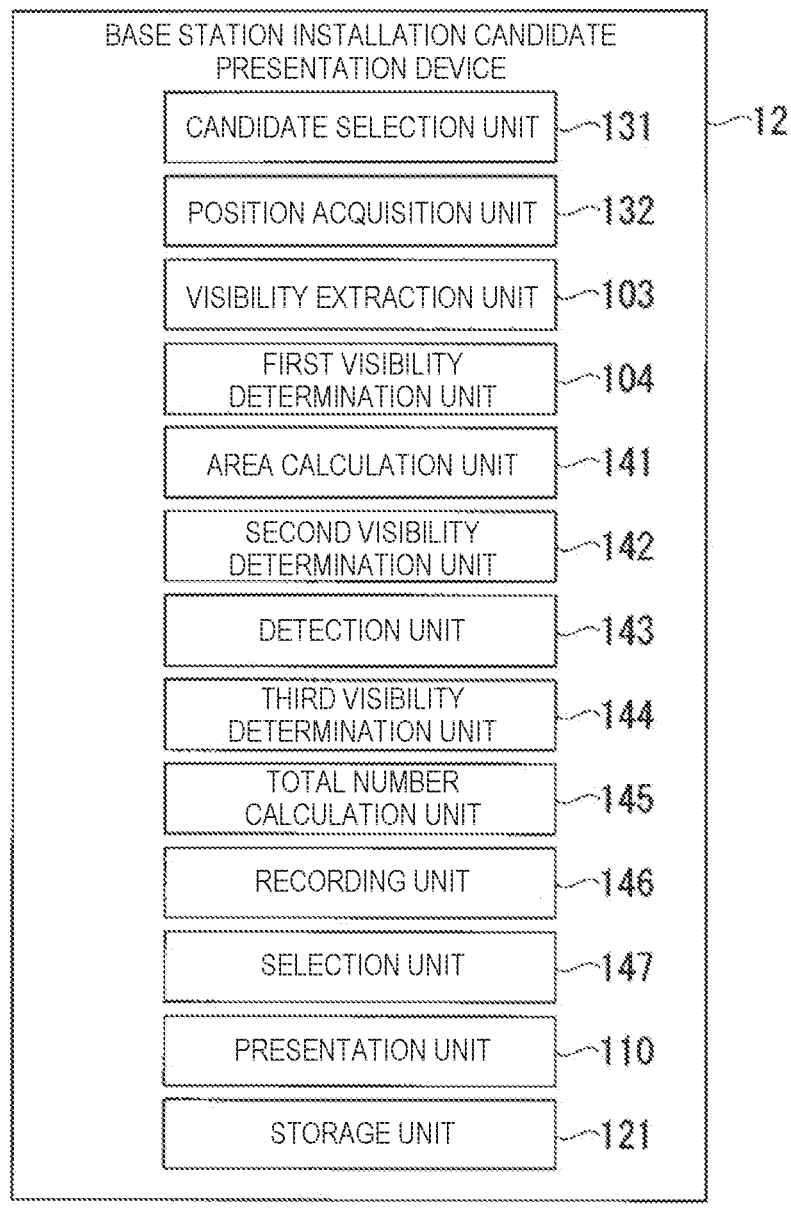
FIG. 12 is a block diagram illustrating the configuration of a base station installation candidate presentation device according to a third embodiment.

FIG. 12 is a block diagram illustrating the configuration of a base station installation candidate presentation device 12 according to the present embodiment. In FIG. 12, a portion identical to that of the base station installation candidate presentation device 11 according to the second embodiment illustrated in FIG. 8 is denoted by an identical reference sign, and description thereof is omitted. The base station installation candidate presentation device 12 illustrated in the drawing is different from the base station installation candidate presentation device 11 of the second embodiment in that an area calculation unit 141, a second visibility determination unit 142, a detection unit 143, a third visibility determination unit 144, a total number calculation unit 145, a recording unit 146, and a selection unit 147 are provided in place of the area calculation unit 105, the second visibility determination unit 106, the total area calculation unit 107, the recording unit 108, and the selection unit 109.

The area calculation unit 141 calculates the area of a stereoscopically visible wall surface range that is visible from a base station installation candidate for each of a plurality of wall surfaces of each consideration-target building by using point group data, and determines that the visibility exists when the area is larger than a predetermined reference. The second visibility determination unit 142 determines whether or not wall surfaces of all consideration-target buildings are visible. The detection unit 143 detects windows and balconies on a visible wall surface of each consideration-target building by using point group data. The third visibility determination unit 144 determines whether or not there is a consideration-target building having no visible window nor balcony in the consideration-target region. The total number calculation unit 145 calculates the total number of windows and balconies visible from the base station installation candidate for all consideration-target buildings in the consideration-target region. The recording unit 146 writes, to the storage unit 121, the total number of windows and balconies calculated by the total number calculation unit 145. The selection unit 147 selects a base station installation candidate to be presented based on the total number of windows and balconies.

Figure 13:
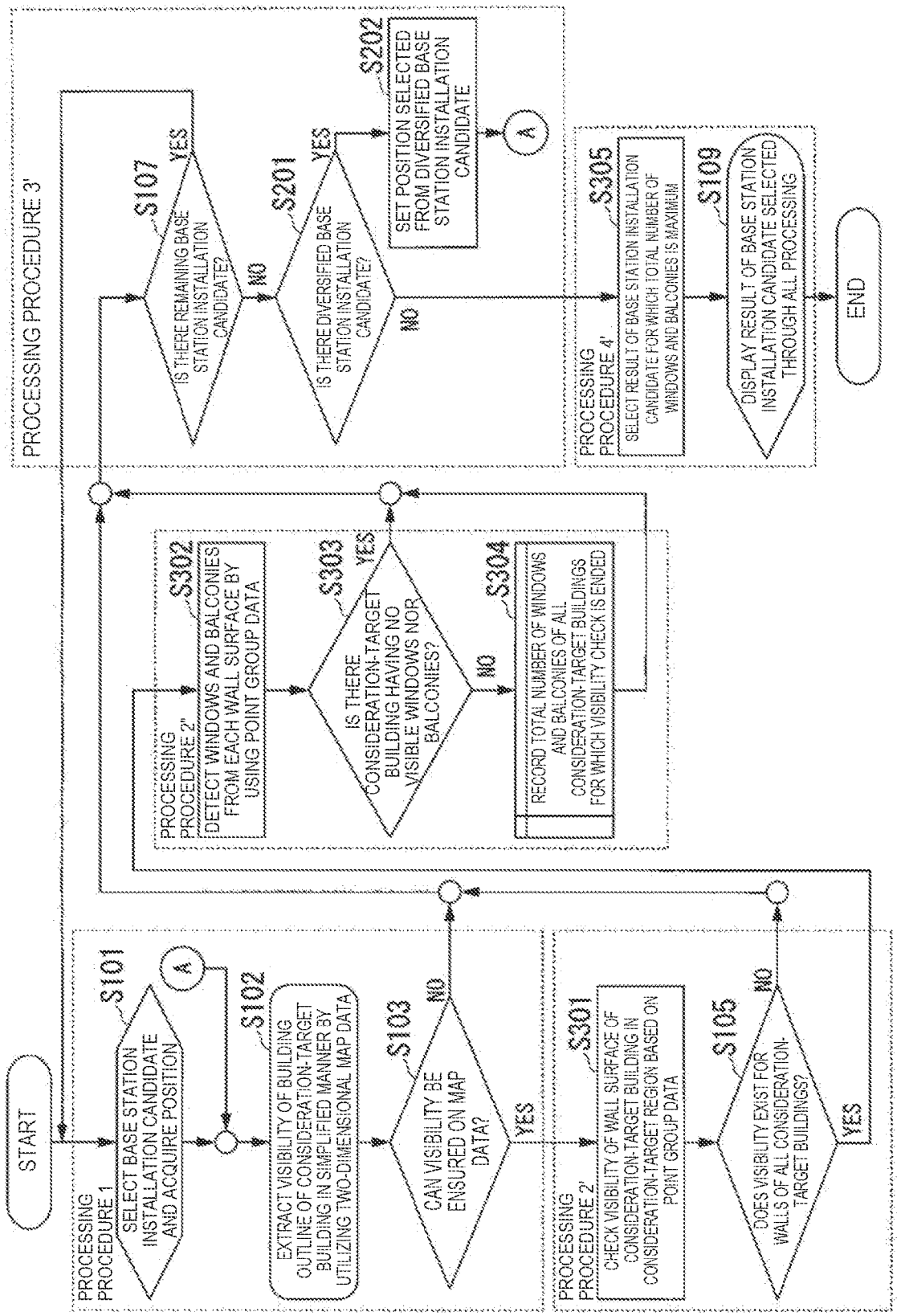
FIG. 13 is a diagram illustrating an operation flow of base station installation candidate presentation processing by the base station installation candidate presentation device according to the embodiment.

FIG. 13 is a diagram illustrating an operation flow of base station installation candidate presentation processing by the base station installation candidate presentation device 12. In the drawing, processing same as that in the operation flow of the second embodiment illustrated in FIG. 9 is denoted by a reference sign in the drawing, and detailed description thereof is omitted.

Similarly to the first embodiment (FIG. 2) and the second embodiment (FIG. 9) described above, operation of the base station installation candidate presentation device 12 of the third embodiment illustrated in FIG. 13 also mainly includes four processing procedures (processes).

In the first Processing Procedure 1, similarly to the first and second embodiments, the base station installation candidate presentation device 12 extracts an outline of a consideration-target building that is visible from a base station when the base station is installed at an outdoor communication facility on a map. In the operation flow in FIG. 13, the base station installation candidate presentation device 12 performs Processing Procedures 2' and 2" in place of Processing Procedure 2 in the first and second embodiments. In Processing Procedures 2' and 2", the base station installation candidate presentation device 12 detects windows and balconies on a wall surface that is visible from the base station by using point group data, and when all target buildings have visible windows and balconies, records the total number of the windows and balconies. In Processing Procedure 3', which is same as that in the second embodiment, the base station installation candidate presentation device 12 extends and diversifies the base station installation candidates. In the operation flow in FIG. 13, the base station installation candidate presentation device 12 performs Processing Procedure 4' in place of Processing Procedure 4 in the first and second embodiments. The base station installation candidate presentation device 12 compares the total number of visible windows and balconies detected for each base station installation candidate in Processing Procedure 2" described above, and selects and presents a base station installation candidate having the maximum number.

As described above, the base station installation candidate presentation device 12 of the present embodiment performs Processing Procedures 2' and 2" in place of Processing Procedure 2 of FIGS. 2 and 9, and performs Processing Procedure 4' in place of Processing Procedure 4 of FIGS. 2 and 9. In FIG. 13, the base station installation candidate presentation device 12 performs Processing Procedure 3' of FIG. 9, but may perform Processing Procedure 3 of FIG. 2 in place of Processing Procedure 3'. In this manner, the base station installation candidate presentation device 12 detects windows and balconies on a wall surface and performs visibility determination of these windows and balconies from the base station instead of visibility of the wall surface. Then, the base station installation candidate presentation device 12 performs comparison of the total number of visible and windows and balconies instead of comparison of the total area of visible wall surfaces in Processing Procedure 4. The following sequentially describes in further detail each respective processing of Processing Procedures 2' and 2", in particular, among these four processing procedures.

First in Processing Procedure 1, the candidate selection unit 131 selects any one communication facility in the consideration-target region, and the position acquisition unit 132 acquires information of the position of the selected base station installation candidate from the additional information of map data (step S101). The visibility extraction unit 103 extracts visibility of a building outline from the base station installation candidate in a simplified manner utilizing the map data of a two-dimensional map (step S102). The first visibility determination unit 104 determines whether or not visibility can be ensured for all consideration-target buildings on the map data (step S103). When having determined that visibility can be ensured for all consideration-target buildings (YES at step S103), the first visibility determination unit 104 passes processing to the area calculation unit 105, and proceeds to step S104 in Processing Procedure 2'. When having determined that visibility cannot be ensured for even a part of a consideration-target building (NO at step S103), the first visibility determination unit 104 passes processing to the candidate selection unit 131, and proceeds to step S107 in Processing Procedure 3'.

In Processing Procedure 2', the base station installation candidate presentation device 12 performs steps S301 and S105 as follows.

The area calculation unit 141 checks visibility from the base station installation candidate for each of a plurality of wall surfaces of each consideration-target building by using point group data (step S301). When it is determined that the visibility is checked based on the map data at step S103 in Processing Procedure 1 (YES), the area calculation unit 141 checks whether visibility exists for the wall surfaces of a building by utilizing the point group data at step S301. The check at this time corresponds to preparation for whether windows and balconies can be detected on the wall surfaces in the subsequent Processing Procedure 2". Thus, a visible part of one wall surface needs to be larger than a certain degree of the reference area (of a size including at least a small window). Accordingly, the area calculation unit 141 calculates the area of each of a plurality of wall surfaces of each consideration-target building, which is visible from the base station installation candidate, by using the point group data, and determines that the visibility exists when the area is larger than a predetermined reference or that no visibility exists when the area is smaller than the predetermined reference. A result of the check at step S301 is used for determination at the subsequent step S105.

The second visibility determination unit 142 determines whether or not visibility exists for wall surfaces of all consideration-target buildings (step S105). When having received the result of the visibility check of wall surfaces of the consideration-target buildings at step S301 and determined that visibility exists for wall surfaces of all consideration-target buildings in the consideration-target region (YES at step S105), the second visibility determination unit 142 passes processing to the detection unit 143, and proceeds to step S302 in Processing Procedure 2". The detection unit 143 detects windows and balconies on each wall surface. When having determined that at least one consideration-target building in the consideration-target region has wall surfaces for which no visibility exists (NO at step S105), the second visibility determination unit 142 passes processing to the candidate selection unit 131, and proceeds to step S107 in Processing Procedure 3'.

In Processing Procedure 2", the base station installation candidate presentation device 12 performs steps S302 to S304 as follows.

The detection unit 143 detects windows and balconies from the respective wall surfaces by using the point group data (step S302). The processing at this step S302 is performed when it is determined that visibility exists for wall surfaces of all consideration-target buildings at step S105 in the previous Processing Procedure 2' (YES). The detection unit 143 takes point group data of a plane part corresponding to each visible wall surface out of point group data stored in the storage unit 121 through collation with the latitude and longitude of a building outline on the map data. The detection unit 143 performs window and balcony detection processing on each point group data of one plane that corresponds to a wall surface. In this detection processing, there can certainly exist a wall surface from which no window nor balcony is detected (simply a wall surface only is found in a direction of the building in some actual cases).

The processing at step S302, which detects windows and balconies from the point group data of one plane that corresponds to a wall surface, will be described later in detail with reference to FIGS. 14 and 15.

The third visibility determination unit 144 determines whether or not there is a consideration-target building having no visible windows nor balconies (step S303). When the detection unit 143 completes the window and balcony detection processing on each wall surface at step S302, the third visibility determination unit 144 checks whether or not visibility from the base station installation candidate exists for the windows and balconies of the wall surfaces. The third visibility determination unit 144 makes the positive determination when one or more consideration-target buildings in the consideration-target region has no windows nor balconies that are visible from the base station installation candidate, or makes the negative determination when all consideration-target buildings in the consideration-target region have one or more visible windows or balconies. When having made the positive determination at step S303, the third visibility determination unit 144 passes processing to the candidate selection unit 131, and proceeds to step S107 in Processing Procedure 3'. When having made the negative determination at step S303, the third visibility determination unit 144 passes processing to the total number calculation unit 145, and proceeds to step S304.

The recording unit 146 records, in the storage unit 121, the total number of windows and balconies of all consideration-target buildings for which the visibility check is ended (step S304). The processing at step S304 is performed when it is checked that all consideration-target buildings have a visible window or balcony (NO) at the previous step S303. Thus, the total number calculation unit 145 calculates a total number by summing the number of windows or balconies detected by the detection unit 143 at step S303 described above for all consideration-target buildings in the consideration-target region. The recording unit 146 associates, and stores in the storage unit 121, the calculated total number with the identification information and installation candidate position of the base station installation candidate. The base station installation candidate presentation device 12 proceeds to step S107 in Processing Procedure 3'.

In Processing Procedure 3', the candidate selection unit 131 determines whether or not there is a remaining base station installation candidate (step S107). Step S107 is executed when it is determined in Processing Procedure 1 that there is a consideration-target building for which visibility cannot be ensured in the consideration-target region on the map data (NO at step S103), when it is determined based on the point group data that there is a consideration-target building for which no visibility exists in the consideration-target region in Processing Procedure 2' (NO at step S105), when it is determined that there is a consideration-target building having no visible windows nor balconies in the consideration-target region in Processing Procedure 2" (YES at step S303), or when the processing of recording the total number of windows and balconies of all consideration-target buildings in the consideration-target region is ended in Processing Procedure 2" (step S304). In these cases, the candidate selection unit 131 performs determination by checking whether or not there is a further remaining base station installation candidate in the consideration-target region other than a base station installation candidate selected so far (step S107). When having determined that there is another base station installation candidate (YES at step S107), the candidate selection unit 131 returns to step S101 in Processing Procedure 1 again, and selects a base station installation candidate different from an already selected base station installation candidate, and the base station installation candidate presentation device 12 sequentially repeats the subsequent processing. When having determined that there is no other base station installation candidate (NO at step S107), the candidate selection unit 131 proceeds to step S201.

Similarly to the second embodiment, the candidate selection unit 131 determines whether or not there is a diversified base station installation candidate (step S201). Specifically, the candidate selection unit 131 is not limited to an outdoor communication facility, but extends and diversifies a base station installation candidate to the range of several meters from a utility pole when, for example, an auxiliary instrument for installing the base station at the utility pole can be attached. The candidate selection unit 131 checks, for this diversified base station installation candidate as well, whether or not there is a remaining base station installation candidate. When having determined that there is a diversified base station installation candidate (YES at step S201), the candidate selection unit 131 performs processing at step S202. When having determined that there is no remaining base station installation candidate and the diversified base station installation candidate is already considered (NO at step S201), the candidate selection unit 131 passes processing to the selection unit 147, and proceeds to step S305 in Processing Procedure 4'.

The candidate selection unit 131 selects one position from the diversified base station installation candidates, and the position acquisition unit 132 sets the selected position of the base station installation candidate as a calculation condition (step S202). After the position acquisition unit 132 acquires the position of the base station installation candidate selected from among remaining diversified base station installation candidates at step S202, the visibility extraction unit 103 performs the processing at step S102 in Processing Procedure 1 again.

In the last processing procedure 4', the base station installation candidate presentation device 12 performs processing at steps S305 and S109 as follows.

The selection unit 147 compares the total number of windows and balconies recorded in the storage unit 121 among each of the base station installation candidates (step S305). Step S305 is performed when it is determined that no diversified base station installation candidate remains in Processing Procedure 3' described above. As a result of the comparison, the selection unit 147 selects a base station installation candidate for which the maximum total number is obtained.

The presentation unit 110 displays a result of the base station installation candidate selected through the processing so far (step S109). Specifically, the presentation unit 110 presents, to the user, information of the base station installation candidate selected by the selection unit 147 at the previous step S305 through the processing so far. For example, the presentation unit 110 displays, on the display, information such as the name, identification information, and position on a map of the selected base station installation candidate.

At step S305 described above, the selection unit 147 may provide ranks in descending order of the total number of windows and balconies, and select a base station installation candidate at a predetermined rank or higher, or may select all base station installation candidates for which the total number of windows and balconies is calculated. In this case, at step S109, the presentation unit 110 displays, on the display, rank information and information of the total number of windows and balconies in addition to information such as the name, identification information, and position on a map of the base station installation candidate selected by the selection unit 147. The presentation unit 110 may also display information of a base station installation candidate for which the negative determination is made at step S103 or S105 and a base station installation candidate for which the positive determination is made at step S303, and information of no visibility.

The base station installation candidate presentation device 12 may perform the processing at step S104, in the same manner as in the above-described case of the positive determination, when it is determined at step S103 that visibility can be ensured for a part or a predetermined fraction or more of consideration-target buildings in the consideration-target region. The base station installation candidate presentation device 12 may perform the processing at step S106, in the same manner as in the above-described case of the positive determination, when it is determined at step S105 that visibility exists for a part or a predetermined fraction or more of consideration-target buildings in the processing-target region. The base station installation candidate presentation device 12 may perform the processing at step S304, in the same manner as in the above-described case of the negative determination, when it is determined at step S303 that, for example, a predetermined number or less or a predetermined fraction or less of consideration-target buildings have no visible windows nor balconies. In this case, the presentation unit 110 may display that visibility is ensured for only a part of the consideration-target buildings, the fraction of consideration-target buildings having a visible window or balcony in the consideration-target region, information of a consideration-target building having a visible window or balcony, and information of a consideration-target building having no visible window nor balcony.

Figure 14:
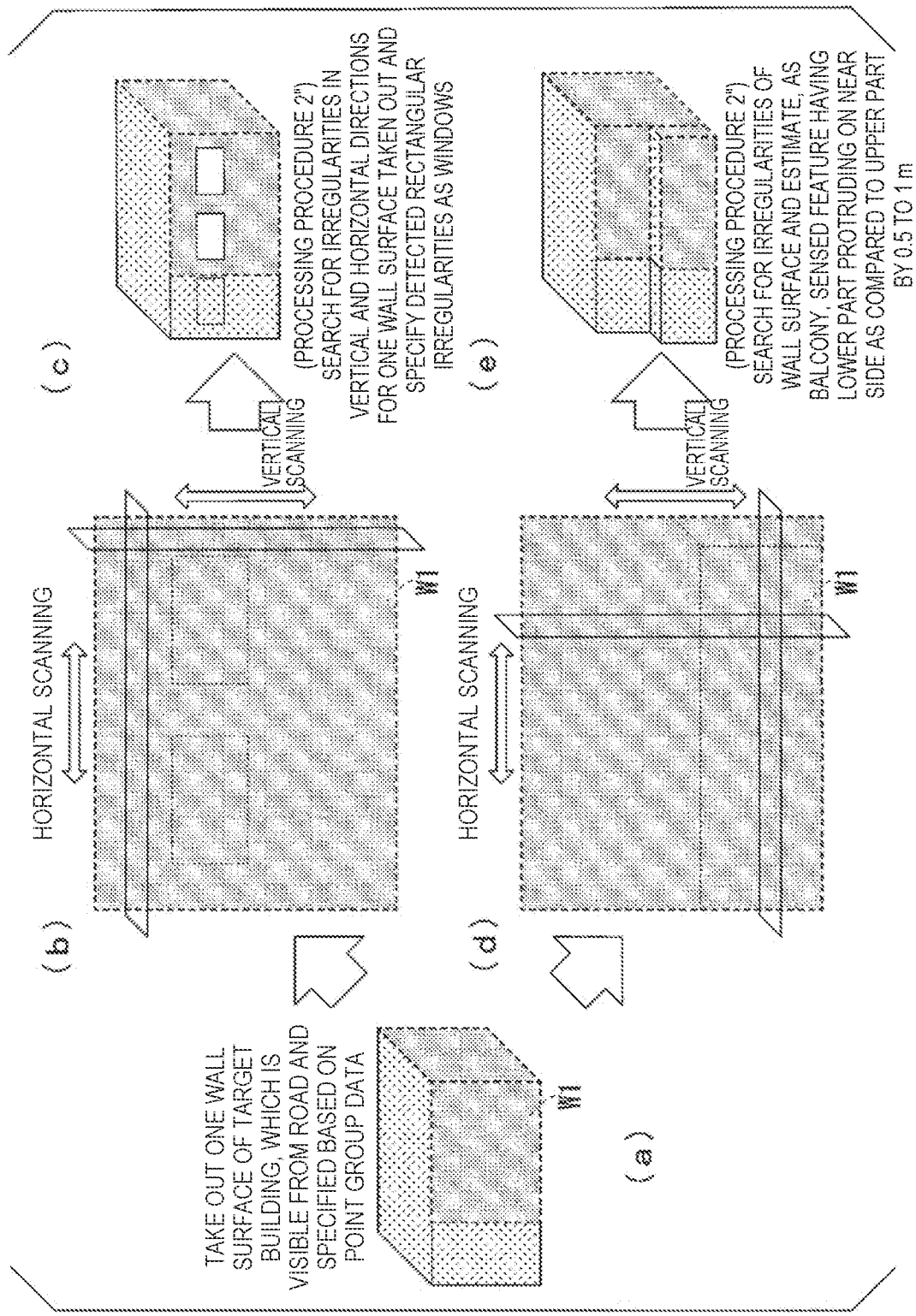
FIG. 14 is a diagram illustrating processing of detecting window frames and balconies from a wall surface by using point group data according to the embodiment.

FIG. 14 is a diagram illustrating processing of detecting window frames and balconies from a wall surface using point group data. Part (a) of FIG. 14 illustrates a typical example of a wall surface of a consideration-target building, which is visible from a base station (base station installation candidate) installed at a utility pole, detected through the processing illustrated in FIG. 4 or 6 in the first embodiment described above. In the example in Part (a) of FIG. 14, the detection unit 143 takes, as a processing target, a visible wall surface range W1 that is a visible range out of one wall surface.

Part (b) of FIG. 14 illustrates an example in which two windows exist in the visible wall surface range W1. As illustrated in Part (b) of FIG. 14, the detection unit 143 performs scanning in the two directions of a vertical direction and a horizontal direction with respect to the plane of the visible wall surface range W1. Part (c) of FIG. 14 illustrates a situation in which the detection unit 143 searches for irregularities by scanning the plane of the visible wall surface range W1 in Part (b) of FIG. 14 in the two directions of the vertical direction and the horizontal direction, and as a result, detects rectangular irregularities, and specifies windows on the building wall surface.

Part (d) of FIG. 14 illustrates an example in which one balcony exists in the visible wall surface range W1. As illustrated in Part (d) of FIG. 14, the detection unit 143 performs scanning in the two directions of the vertical direction and the horizontal direction with respect to the plane of the visible wall surface range W1. Part (e) of FIG. 14 illustrates a situation in which the detection unit 143 searches for irregularities by scanning the plane of the visible wall surface range W1 in Part (d) of FIG. 14 in the two directions of the vertical direction and the horizontal direction, and as a result, senses a feature having the lower part protruding on the near side by 0.5 to 1 m as compared to the upper part, and estimates a balcony on the building wall surface.

In the example in which two windows are detected from the visible wall surface range W1 as illustrated in Parts (b) and (c) of FIG. 14, features listed in (1) and (2) below are found by scanning in the two directions of the vertical direction and the horizontal direction.

(1) The scanning (vertical scanning) in the vertical direction has features as follows.
  (1-1) The upper part (upper side of windows) has a straight shape with no irregularities.
  (1-2) There are two irregularities at the center (part of windows). The two irregularity parts (corresponding to two windows) are at the same position in scanning in the vertical direction.
  (1-3) The lower part (lower side of windows) has a straight shape with no irregularities.
(2) The scanning (horizontal scanning) in the horizontal direction finds features as follows.
  (2-1) A part (left side of the two windows) close to the left side edge has a straight shape with no irregularities.
  (2-2) A left side part (part of the window on the left side) has one irregularity. The one irregularity is at the same position in scanning in the horizontal direction.
  (2-3) The center (part between the two windows) has a straight shape with no irregularities.
  (2-4) A right side part (part of the window on the right side) has one irregularity. The one irregularity part is at the same position in scanning in the horizontal direction. In addition, the irregularity at the above-described left part (part of the window on the left side) is at the same position.
  (2-5) A part (right side of the two windows) close to the right side edge has a straight shape with no irregularities.

In the example illustrated in Parts (d) and (e) of FIG. 14 in which a balcony is detected from the visible wall surface range W1, features listed in (3) and (4) below, which are different from those of the above-described window detection, are found by scanning in the two directions of the vertical direction and the horizontal direction.

(3) The vertical scanning finds features as follows.
  (3-1) An upper part (upper side of a balcony) has a straight shape with no irregularities.
  (3-2) A lower part (balcony part) has a straight shape with no irregularities.
(4) The horizontal scanning finds features as follows.
  (4-1) A left side part (left side of the balcony) has one large step (balcony vertical boundary part). The step has a lower side protruding on the near side and an upper side retracted on the far side.
  (4-2) A center part (the center of the balcony) has one large step at a position (balcony vertical boundary part) same as that of the above-described left side part, and the step has a lower side protruding on the near side and an upper side retracted on the far side.
  (4-3) A right side part (balcony part) is of a situation same as those of the above-described left side part and center part.

Figure 15:
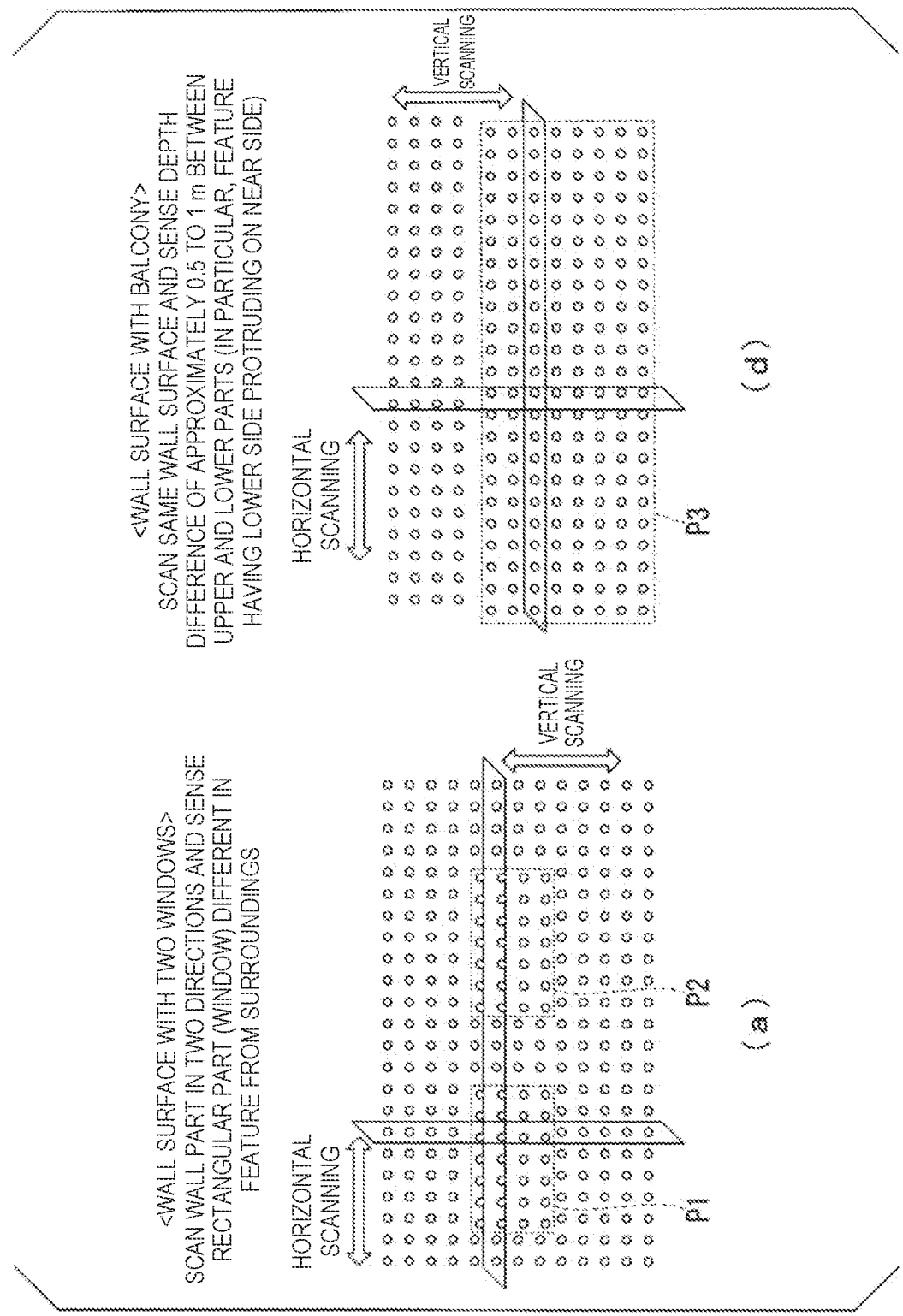
FIG. 15 is a diagram for description of processing of detecting characteristics of irregularity distribution obtained by vertical scanning and horizontal scanning of a wall surface according to the embodiment.
Figure 16:
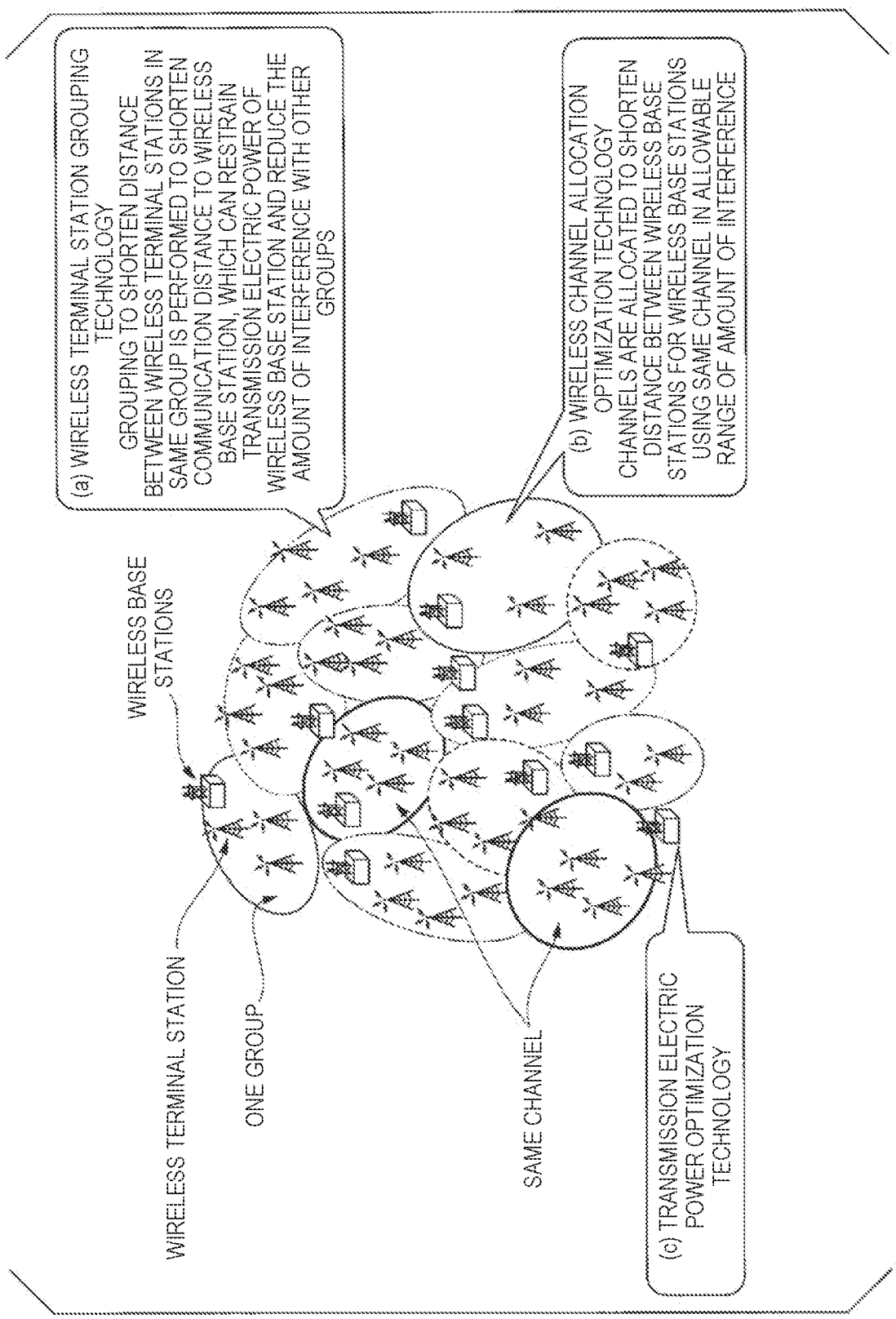
FIG. 16 is a diagram illustrating a conventional station allocation designing technology.
Figure 17:
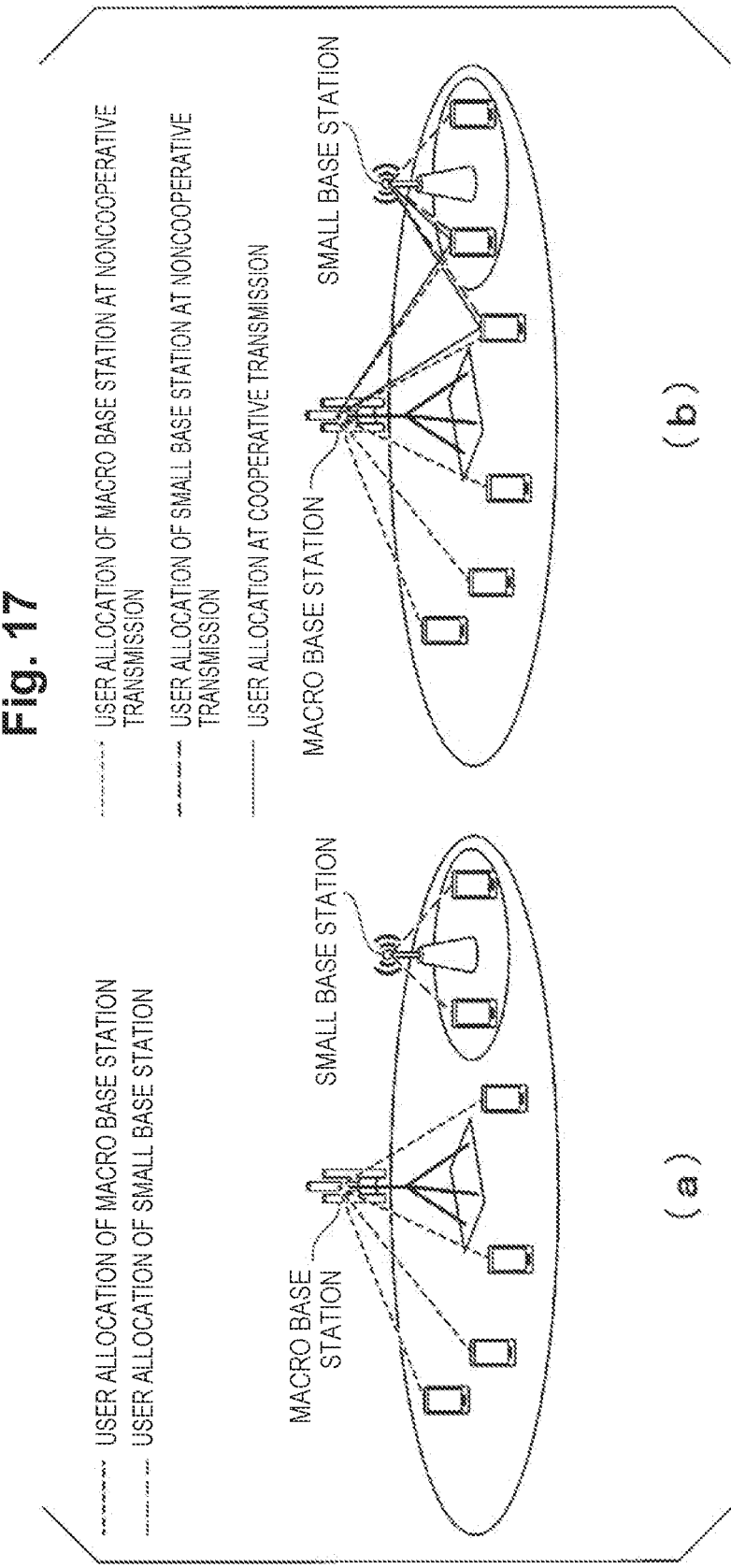
FIG. 17 is a diagram illustrating a designing technology of conventional base station disposition.
Figure 18:
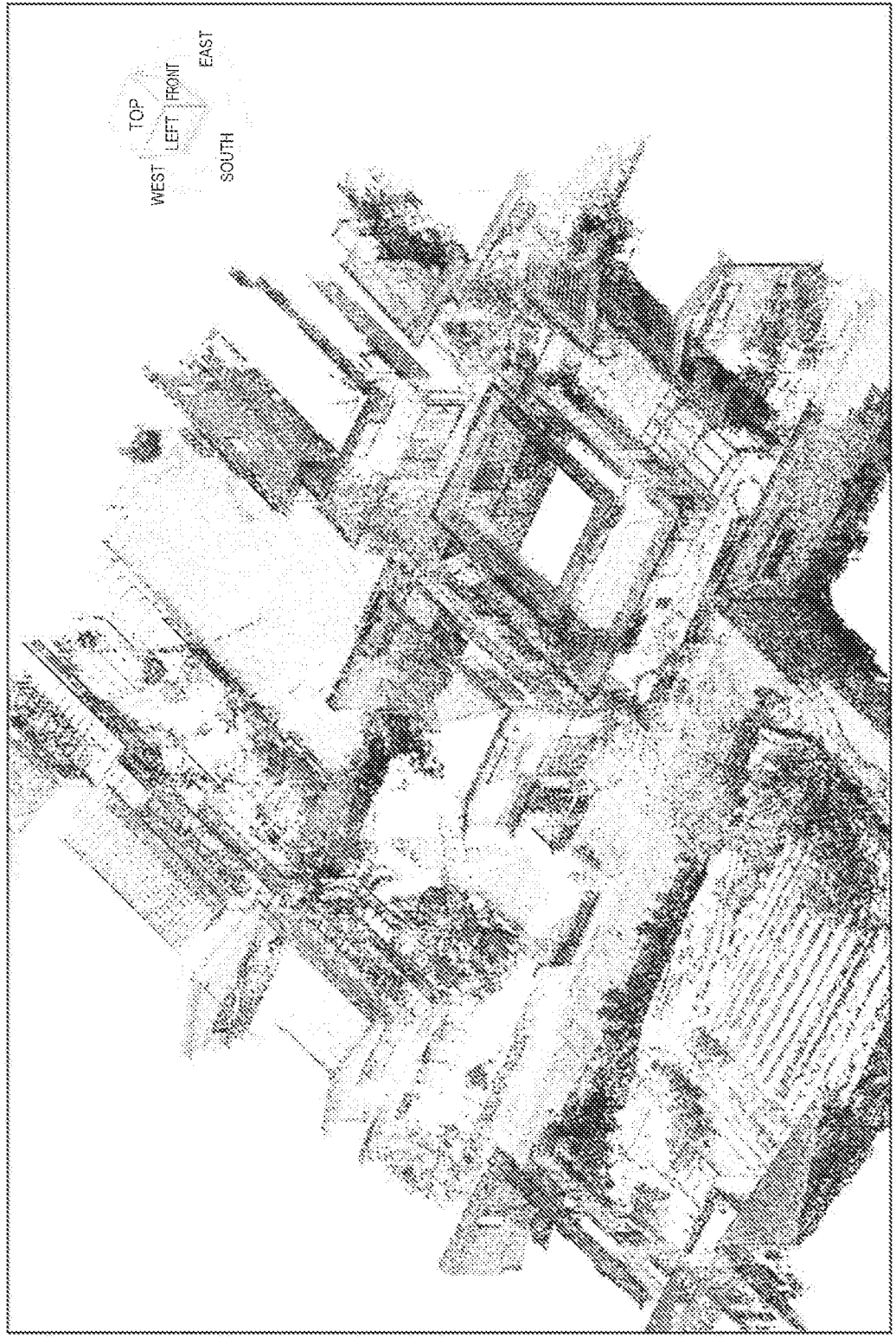
FIG. 18 is a diagram illustrating the shapes of houses modeled by using conventional point group data.

FIG. 15 is a diagram for description of processing of detecting features of irregularity distribution obtained by vertical scanning and horizontal scanning of a wall surface. Part (a) of FIG. 15 illustrates point group data obtained by scanning the plane of the visible wall surface range W1 having two windows in Part (b) of FIG. 14. Part (b) of FIG. 15 illustrates point group data obtained by scanning the plane of the visible wall surface range W1 having a balcony in Part (d) of FIG. 14. The detection unit 143 detects the windows and balconies by utilizing these pieces of point group data.

The situation illustrated in Part (a) of FIG. 15 in which there are windows on the wall surface and the situation illustrated in Part (b) of FIG. 15 in which there is a balcony on the wall surface correspond to the above-described example in which there are windows in Parts (b) and (c) of FIG. 14 and the above-described example in which there is a balcony on the lower side in Parts (d) and (e) of FIG. 14, respectively. The following describes handling of point group data in each example with reference to FIG. 15.

The detection unit 143 scans part of point group data corresponding to a wall surface of the wall surface having two windows as illustrated in Part (a) of FIG. 15 in the two directions of the vertical direction and horizontal direction. When such scanning is performed, rectangles P1 and P2 as parts of the entire point group data have features different from the surroundings. Specifically, point group data corresponding to a wall surface around the windows and point group data of the rectangles P1 and P2 parts corresponding to the windows are not precisely on an identical plane, but are found to have irregularities. In this manner, the ranges of part of the rectangles (the two rectangles P1 and P2 in Part (a) of FIG. 15) are different from surroundings in feature, and thus it can be sensed that there are two windows on the wall surface.

As in the above-described window example, the detection unit 143 scans part of point group data corresponding to a wall surface of the wall surface having a balcony as illustrated in Part (b) of FIG. 15 in the two directions of the vertical direction and horizontal direction. Such scanning finds that there is a depth difference (step) of approximately 0.5 to 1 m between the upper and lower parts of the wall surface. The depth difference between the upper and lower parts, which is indicated by the point group data, occurs as the lower side protrudes (has a convex shape) on the near side and the upper side is retracted (has a concave shape) on the far side.

For such point group data corresponding to one wall surface, a balcony can be sensed by checking a feature of a large depth difference between the upper and lower parts.

According to the above-described embodiment, the base station installation candidate presentation device extracts a visible outline of a target building on a map for a plurality of candidates for the installation position of an outdoor base station, and calculates the area of a visible wall surface by using the extracted outline and point group data. The base station installation candidate presentation device selects an installation position for which the total sum of the area is maximum from among installation positions from which all target wall surfaces are visible.

Alternatively, the base station installation candidate presentation device extracts a visible outline of a target building on a map for a plurality of candidates for the installation position of an outdoor base station, and detects windows and balconies on a visible wall surface by using the extracted outline and point group data. The base station installation candidate presentation device selects an installation position for which the total number of windows and balconies is maximum from among installation positions from which all target windows and balconies are visible.

With the above-described configuration, when wireless communication is to be performed between a base station fixed and installed at an outdoor communication facility and a terminal station fixed and installed at a building, the base station installation candidate presentation device can select and present a communication facility as a promising candidate at which the base station is to be installed from among a plurality of outdoor communication facilities, taking into account the environmental situation around an urban region or a housing region where the base station and the wireless terminal are to be installed.

Functions of the base station installation candidate presentation devices 10, 11, and 12 in the above-described embodiment may be achieved by a computer. In this case, a computer program for achieving the functions may be recorded in a computer-readable recording medium, and a computer system may read and execute the computer program recorded in the recording medium to achieve the functions. The "computer system" referred here includes an OS and hardware such as a peripheral equipment. The "computer-readable recording medium" is a portable medium such as a flexible disk, a magneto-optical disc, a ROM, or a CD-ROM, or a storage device such as a hard disk built in the computer system. The "computer-readable recording medium" may be a medium configured to dynamically hold the computer program for a short time, such as a communication wire in a case in which the computer program is transmitted through a network such as the Internet or a communication line such as a phone line, or may be a medium configured to hold the computer program for a certain time, such as a volatile memory inside a computer system that is a server or client in this case. The above-described computer program may be for achieving a part of the above-described functions, or may further be able to achieve the above-described functions in combination with a computer program already recorded in the computer system.

The base station installation candidate presentation devices 10, 11, and 12 may be achieved by a plurality of computer devices connected with a network. In this case, it may be optional which of the plurality of computer devices achieve each function unit of the base station installation candidate presentation devices 10, 11, and 12. Identical function units may be achieved by a plurality of computer devices.

According to the above-described embodiment, an installation candidate presentation device includes a storage unit, a visibility extraction unit, a calculation unit, a total calculation unit, and a presentation unit. For example, the installation candidate presentation device is the base station installation candidate presentation device 10, 11, or 12. The storage unit stores planar map data indicating a planar map of a region including each of one or more installation candidates that are candidates for the installation place of a first wireless device, and target buildings at which one or more second wireless devices configured to wirelessly communicate with the first wireless device are to be installed.

The planar map data is, for example, map data used for Optos. In addition, the storage unit stores three-dimensional map data indicating a three-dimensional map obtained by measuring the same region as the planar map data. The three-dimensional map data is, for example, point group data measured by the MMS 31. The visibility extraction unit extracts, for each installation candidate, an outline range of a building, which is visible from the installation candidate by using the planar map data. The calculation unit calculates, for each installation candidate, by using the three-dimensional map data, the area of part of a wall surface corresponding to the outline range extracted by the visibility extraction unit, the part being visible from the installation candidate. For example, the calculation unit is the area calculation unit 105. The total calculation unit calculates, for each installation candidate, the total of the area calculated by the area calculation unit for each building in the region. For example, the total calculation unit is the total area calculation unit 107. The presentation unit presents an installation candidate selected from among the installation candidates based on the total calculated by the total calculation unit.

The calculation unit may calculate, for each installation candidate, by using the three-dimensional map data, the number of windows or balconies on the wall surface corresponding to the outline range extracted by the visibility extraction unit. The total calculation unit calculates, for each installation candidate, the total number of the number of windows or balconies calculated for each building in the region. In this case, for example, the calculation unit is the detection unit 143, and the total calculation unit is the total number calculation unit 145.

An installation candidate for the first wireless device is an outdoor communication facility in the region. Alternatively, an installation candidate for the first wireless device may include, in addition to an outdoor communication facility in the region, a position separated from the communication facility by a length in accordance with an instrument used to attach the first wireless device to the communication facility.

Although the embodiments of the present invention are described above in detail with reference to the accompanying drawings, specific configurations are not limited to the present embodiment, but also include designing and the like without departing from the scope of the present invention.

INDUSTRIAL APPLICABILITY

The present invention is applicable to selection of the installation place of a wireless device that wirelessly communicates with a plurality of other wireless devices.

REFERENCE SIGNS LIST 10, 11, 12 base station installation candidate presentation device
31 MMS
32 vehicle
51, 61 utility pole
52, 62 auxiliary instrument
53, 63 communication cable
54, 64 base station
101, 131 candidate selection unit
102, 132 position acquisition unit
103 extraction unit
104 first visibility determination unit
105, 141 area calculation unit 106, 142 second visibility determination unit
107 total area calculation unit
108, 146 recording unit
109, 147 selection unit
110 presentation unit
121 storage unit
143 detection unit
144 third visibility determination unit
145 total number calculation unit

The invention claimed is:

1. An installation candidate presentation method comprising:
by a mobile mapping system mounted on a vehicle, collecting planar and three-dimensional map data used to determine installation candidates;
by one or more processors, extracting, for each of one or more installation candidates that are candidates for an installation place of a first wireless device, by using the planar map data indicating a planar map of a region including the installation candidates and a target building at which one or more second wireless devices configured to wirelessly communicate with the first wireless device are to be installed, respectively, an planar wall surface range of the building, which is visible from the installation candidate,
wherein the planar map data includes data of a two dimensional map of GeoSpace used in Outside plant Provisioning and inTelligent Operating Systems (Optos);
by one or more processors, calculating, for each installation candidate, by using the three-dimensional map data indicating a three-dimensional map obtained by measuring the region, areas of parts of stereoscopically visible wall surfaces corresponding to the outline range extracted, the parts being visible from the installation candidate;
by one or more processors, calculating, for each installation candidate, a total of the areas calculated for the building included in the region; and
by one or more processors, presenting an installation candidate selected from among the installation candidates based on the one of the installation candidates having the maximum one of the total calculated areas, the presenting including one or more processors printing the installation candidate via a printer.

2. The installation candidate presentation method according to claim 1, wherein
the calculating areas of parts of stereoscopically visible wall surfaces includes calculating, for each installation candidate, by using the three-dimensional map data, the number of windows or balconies on the wall surface corresponding to the outline range extracted by the visibility extraction process, and
the calculating the total area includes, for each installation candidate, a total number of the number of windows or balconies calculated by the calculation process for the building included in the region.

3. The installation candidate presentation method according to claim 1, wherein the installation candidate is an outdoor communication facility in the region or includes the communication facility and a position separated from the communication facility by a length in accordance with an instrument used to attach the first wireless device to the communication facility.

4. The installation candidate presentation method according to claim 1, wherein the map data includes information of partition boundaries.

5. The installation candidate presentation method according to claim 1, wherein the map data includes information of premises boundaries.

6. The installation candidate presentation method according to claim 1, wherein the map data includes building outlines of each building.

7. The installation candidate presentation method according to claim 1, wherein the map data includes communication facility information.

8. The installation candidate presentation method according to claim 7, wherein the communication facility information includes identification information of a communication facility.

9. The installation candidate presentation method according to claim 7, wherein the communication facility information includes a position of a communication facility.

10. The installation candidate presentation method according to claim 1, wherein the map data includes building information.

11. The installation candidate presentation method according to claim 10, wherein the building information includes a name, address, and phone number of an owner of each building.

12. An installation candidate presentation device comprising:
a vehicle
a mobile mapping system mounted on the vehicle and configured to collect planar and three-dimensional map data used to determine installation candidates;
a storage unit configured to store planar map data indicating the planar map of a region including one or more installation candidates that are candidates for an installation place of a first wireless device, and a target building at which one or more second wireless devices configured to wirelessly communicate with the first wireless device are to be installed, respectively, and the three-dimensional map data indicating a three-dimensional map obtained by measuring the region,
wherein the planar map data includes data of a two dimensional map of GeoSpace used in Outside plant Provisioning and inTelligent Operating Systems (Optos);
a processor; and
a storage medium having computer program instructions stored thereon, when executed by the processor, perform to:
extract, for each installation candidate, by using the planar map data, an outline range of the building, which is visible from the installation candidate;
calculate, for each installation candidate, by using the three-dimensional map data, areas of parts of a stereoscopically visible wall surface corresponding to the outline range, the parts being visible from the installation candidate;
calculate, for each installation candidate, a total of the areas calculated for the building included in the region; and
present an installation candidate selected from among the installation candidates based on the one of the installation candidates having a maximum one of the total calculated areas, the presenting including printing the installation candidate via a printer.

13. The installation candidate presentation device according to claim 12, wherein the map data includes information of partition boundaries.

14. The installation candidate presentation device according to claim 12, wherein the map data includes information of premises boundaries.

15. The installation candidate presentation device according to claim 12, wherein the map data includes building outlines of each building.

16. The installation candidate presentation device according to claim 12, wherein the map data includes communication facility information.

17. The installation candidate presentation device according to claim 16, wherein the communication facility information includes identification information of a communication facility.

18. The installation candidate presentation device according to claim 16, wherein the communication facility information includes a position of a communication facility.

19. The installation candidate presentation device according to claim 12, wherein the map data includes building information.

20. A non-transitory computer-readable medium having computer-executable instructions that, upon execution of the instructions by a processor of a computer, cause the computer to function as the installation candidate presentation device according to claim 12.

\* \* \* \* \*